United States Patent
Schilling et al.

(10) Patent No.: US 10,007,233 B2
(45) Date of Patent: Jun. 26, 2018

(54) DECORATIVE ELEMENT AND SECURITY DOCUMENT COMPRISING A DECORATIVE ELEMENT

(71) Applicant: OVD Kinegram AG, Zug (CH)

(72) Inventors: Andreas Schilling, Hagendorn (CH); Sebastian Mader, Lucerne (CH); Rene Staub, Hagendorn (CH); Wayne Robert Tompkin, Baden (CH); Harald Walter, Horgen (CH)

(73) Assignee: OVD Kinegram AG, Zug (CH)

( * ) Notice: Subject to any disclaimer, the term of this patent is extended or adjusted under 35 U.S.C. 154(b) by 300 days.

(21) Appl. No.: 14/410,825

(22) PCT Filed: Jun. 25, 2013

(86) PCT No.: PCT/EP2013/063195
§ 371 (c)(1),
(2) Date: Dec. 23, 2014

(87) PCT Pub. No.: WO2014/001283
PCT Pub. Date: Jan. 3, 2014

(65) Prior Publication Data
US 2015/0192897 A1    Jul. 9, 2015

(30) Foreign Application Priority Data

Jun. 26, 2012   (DE) .......... 10 2012 105 571

(51) Int. Cl.
*G03H 1/00*       (2006.01)
*B42D 25/21*     (2014.01)
(Continued)

(52) U.S. Cl.
CPC .......... *G03H 1/0011* (2013.01); *B42D 25/21* (2014.10); *B42D 25/346* (2014.10);
(Continued)

(58) Field of Classification Search
CPC .. B42D 25/328; B42D 25/29; B42D 2035/24;
B42D 25/324; B42D 25/00;
(Continued)

(56) References Cited

U.S. PATENT DOCUMENTS 4,576,439 A * 3/1986 Gale ............... B42D 25/45
359/572
4,657,396 A * 4/1987 Honda ............. G01B 11/303
356/237.2

(Continued)

FOREIGN PATENT DOCUMENTS

CA    2745913    7/2010
CN    1874901    12/2006
(Continued)

OTHER PUBLICATIONS

Rudolf L. van Renesse, "Optical Document Security (Third Edition)." 2005, Artech House, Boston/London, XP 002712491, pp. 2-3, pp. 177-178, pp. 212-217.

(Continued)

*Primary Examiner* — Thomas K Pham
*Assistant Examiner* — Alberto Betancourt
(74) *Attorney, Agent, or Firm* — Hoffmann & Baron, LLP

(57) ABSTRACT

A decorative element (2), in particular in the form of a transfer film, a laminating film or a security thread, as well as a security document with a decorative element and a method for producing same is described. The decorative element (2) has a microstructure (4) which generates an optical effect in incident light and/or with light passing through. In a first area (32), the microstructure (4) has a base surface (40) and several base elements (41) which have in each case an element surface raised or lowered compared with the base surface (40) and a flank arranged between the element surface and the base surface (40). The base surface (Continued)

(40) of the microstructure defines a base plane spanned by coordinate axes x and y. The element surfaces of the base elements (41) in each case run substantially parallel to the base plane. In at least one or more first zones of the first area (32), the element surfaces of the base elements (41) and the base surface (40) are spaced apart in a direction running perpendicular to the base plane (40) in the direction of a coordinate axis z by a first distance which is chosen such that a color is generated in the one or more first zones in particular by interference of the light reflected at the base surface and the element surfaces in incident light and/or in particular by interference of the light transmitted through the element surfaces and the base surfaces with light passing through.

47 Claims, 17 Drawing Sheets

(51) Int. Cl.
| | | |
|---|---|---|
| B42D 25/378 | (2014.01) | |
| B42D 25/373 | (2014.01) | |
| B42D 25/346 | (2014.01) | |
| B42D 25/351 | (2014.01) | |
| B42D 25/36 | (2014.01) | |
| B42D 25/355 | (2014.01) | |
| B44F 1/14 | (2006.01) | |
| B44C 1/17 | (2006.01) | |
| G03H 1/02 | (2006.01) | |
| B42D 25/324 | (2014.01) | |
| G02B 5/18 | (2006.01) | |
| B42D 25/328 | (2014.01) | |
| G09F 3/02 | (2006.01) | |

(52) U.S. Cl.
CPC ......... B42D 25/351 (2014.10); B42D 25/355 (2014.10); B42D 25/36 (2014.10); B42D 25/373 (2014.10); B42D 25/378 (2014.10); B44C 1/1729 (2013.01); B44F 1/14 (2013.01); G02B 5/18 (2013.01); G03H 1/0244 (2013.01); B42D 25/324 (2014.10); B42D 25/328 (2014.10); G09F 2003/0276 (2013.01)

(58) Field of Classification Search
CPC .............. B42D 25/355; B42D 2035/20; B42D 25/373; B42D 25/351; B42D 2033/24; B42D 25/45; B42D 2035/14; B42D 25/425; B42D 2033/10; B42D 25/21; B42D 25/36; B42D 25/378; B42D 25/346; G02B 5/1876; G02B 5/1861; G02B 5/1814; G02B 5/1866; G02B 3/08; G02B 6/02152; G02B 5/18; G03H 1/0011; G03H 1/0244; B44F 1/14; B44C 1/1729

USPC ......... 359/2, 567, 576, 566, 569, 568, 25, 1, 359/565, 570, 571, 742, 743; 283/91, 72, 283/94, 86, 57, 74, 902, 904, 53, 73, 283/113–114
See application file for complete search history.

(56) References Cited

U.S. PATENT DOCUMENTS

| | | |
|---|---|---|
| 2004/0021945 A1 | 2/2004 | Tompkin et al. |
| 2004/0183433 A1* | 9/2004 | Cho ................... H01L 51/5262 313/504 |
| 2005/0068625 A1* | 3/2005 | Schilling ................ B42D 25/29 359/566 |
| 2006/0018021 A1* | 1/2006 | Tomkins .............. G02B 5/1857 359/573 |
| 2007/0183045 A1 | 8/2007 | Schilling et al. |
| 2007/0291362 A1* | 12/2007 | Hill ...................... G02B 5/1842 359/567 |
| 2010/0238529 A1* | 9/2010 | Sampsell ................. G02B 5/32 359/15 |
| 2012/0235399 A1 | 9/2012 | Lochbihler |
| 2013/0285361 A1 | 10/2013 | Staub et al. |
| 2013/0306359 A1* | 11/2013 | Frey ..................... H05K 9/0096 174/252 |
| 2014/0037898 A1 | 2/2014 | Tompkin et al. |

FOREIGN PATENT DOCUMENTS

| | | |
|---|---|---|
| CN | 102245394 | 11/2011 |
| DE | 102008046128 | 3/2010 |
| DE | 102009056933 | 6/2011 |
| DE | 102010050031 | 5/2012 |
| DE | 102011014114 | 5/2012 |
| EP | 2077459 | 7/2009 |
| EP | 2264491 | 12/2010 |
| EP | 2021837 | 7/2014 |
| JP | 2000039508 A | 2/2000 |
| JP | 2001066407 A | 3/2001 |
| JP | 2002090548 A | 3/2002 |
| JP | 2009192979 A | 8/2009 |
| JP | 2010115782 A | 5/2010 |
| JP | 2011194837 A | 10/2011 |
| JP | 2011227338 A | 11/2011 |
| JP | 2012078447 A | 4/2012 |
| JP | 2012088598 A | 5/2012 |
| JP | 2013193268 A | 9/2013 |

OTHER PUBLICATIONS

Stalder et al, "Rolicure TM Pearl: An optically Variable Device for Security Applications," NIP21 International Conference on Digital Printing Technologies, pp. 1-4, Sep. 23, 2005.
Stalder et al., "Novel Optically Variable Color Devices," SPIE EI 6075-27, pp. 1-10, Jan. 19, 2006.

\* cited by examiner

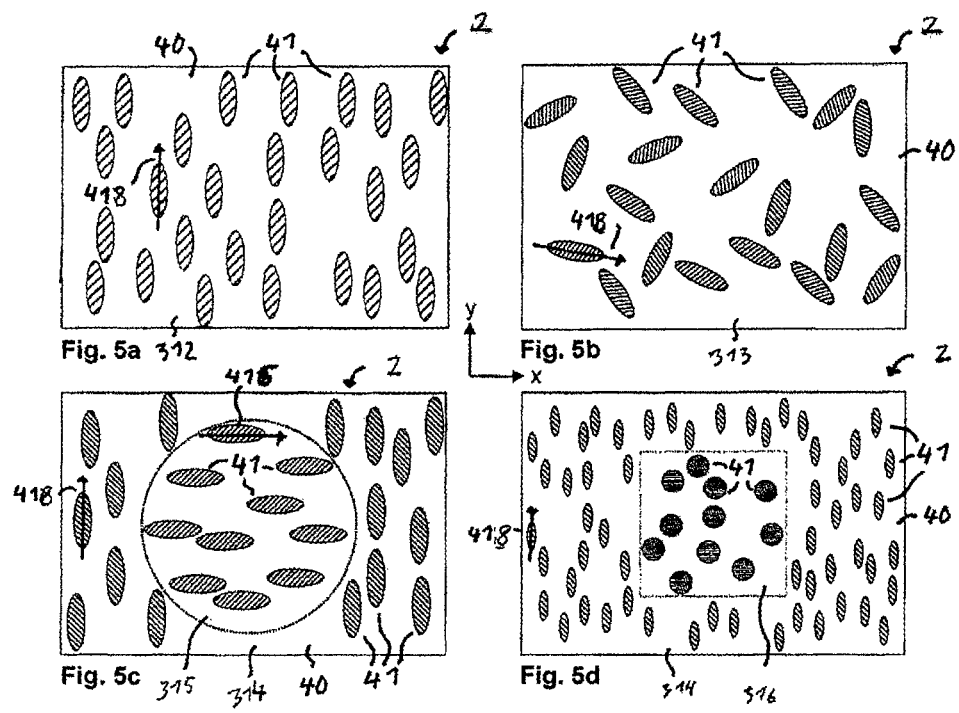
Fig. 5a
Fig. 5b
Fig. 5c
Fig. 5d
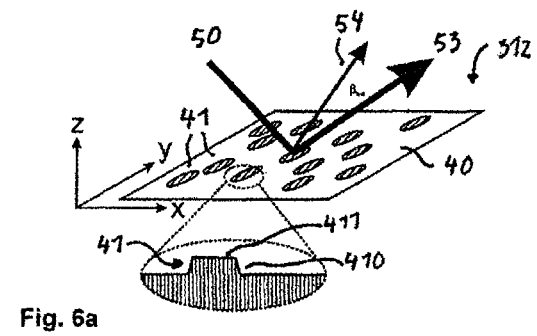
Fig. 6a
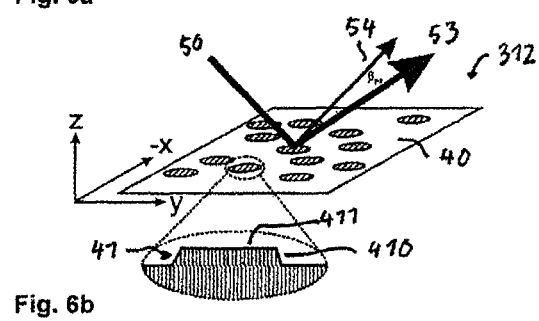
Fig. 6b The CIE 1931, 2° observer chromaticity diagram.

United States Patent 10,007,233 B2

DECORATIVE ELEMENT AND SECURITY DOCUMENT COMPRISING A DECORATIVE ELEMENT

This application claims priority based on an International Application filed under the Patent Cooperation Treaty, PCT/EP2013/063195, filed on Jun. 25, 2013, and German Application No. DE 10201205571.8, filed on Jun. 26, 2012.

BACKGROUND OF THE INVENTION

The invention relates to a decorative element, in particular in the form of a transfer film, a laminating film or a security thread, as well as a security document and a method for producing such a decorative element.

For a start, it is known to use, in security documents, microstructures which display a rainbow-like color gradient when tilted. Holograms are the best-known examples of this. The color gradient is generated on the basis of the wavelength-dependent diffraction of light in the first and higher diffraction orders. The color gradient thus becomes visible, not in the zero diffraction order, for example when the security document is viewed reflected in a mirror reflection, but only when tilted out of the zero diffraction order in a tilting angle range which corresponds to the first or higher diffraction orders.

SUMMARY OF THE INVENTION

The object of the invention now is to specify a decorative element and a method for producing a decorative element which is characterized by striking color effects.

This object is achieved by a decorative element which has a microstructure which generates an optical effect in incident light or with light passing through, wherein the microstructure has, in a first area, a base surface and several base elements which in each case have an element surface that is raised or lowered compared with the base surface and a flank arranged between the element surface and the base surface, wherein the base surface of the microstructure defines a base plane spanned by coordinate axes x and y, wherein the element surfaces of the base elements in each case run substantially parallel to the base plane and wherein in at least one or more first zones of the first area the element surfaces of the base elements and the base surface are spaced apart in a direction running perpendicular to the base plane in the direction of a coordinate axis z by a first distance which is chosen in particular such that a first color is generated in the one or more first zones in particular by interference of the light reflected at the base surface and the element surfaces in incident light and/or in particular by interference of the light transmitted through the element surfaces and the base surface with light passing through.

This object is further achieved by a method for producing a decorative element, wherein in the method a microstructure is introduced into the decorative element, which microstructure generates an optical color effect in incident light or with light passing through and has, in a first area, a base surface and several base elements which in each case have an element surface that is raised or lowered compared with the base surface and a flank arranged between the element surface and the base surface, and the element surfaces of the base elements in each case run substantially parallel to the base plane, and wherein in at least one or more first zones of the first area the element surfaces of the base elements and the base surface are spaced apart in a direction running perpendicular to the base plane by a first distance which is chosen in particular such that a first color is generated in the one or more first zones in particular by interference of the light reflected at the base surface and the element surfaces in incident light and/or in particular by interference of the light transmitted through the element surfaces and the base surface with light passing through.

The microstructure here is preferably coated with a layer that intensifies the reflection, in particular coated with a layer of metal or a high refractive index material, e.g. with aluminum or zinc sulfide (ZnS).

Here, high refractive index means a material with a refractive index in the visible spectral range (typically at a wavelength of approx. 635 nm) of more than 1.7. Examples of such high refractive index first materials are listed in Table 1. The numerical values are only rough guide values, as the refractive index of a layer existing in practice depends on many parameters, such as crystal structure, porosity, etc.

TABLE 1

| Material | Empirical formula | Refractive index n |
|---|---|---|
| Lead sulfide | PbS | 4.33 |
| Zinc telluride | ZnTe | 3.04 |
| Silicon carbide | SiC | 2.64 |
| Iron oxide | $Fe_2O_3$ | 2.92 |
| Barium titanate | $BaTiO_3$ | 2.41 |
| Titanium dioxide (refractive index is dependent on the crystal structure) | $TiO_2$ | >2.4 |
| Zinc sulfide | ZnS | 2.35 |
| Niobden oxide | $Nd_2O_5$ | 2.32 |
| Zirconium oxide | $ZrO_2$ | 2.21 |
| Tantalum pentoxide | $Ta_2O_5$ | 2.2 |
| Zinc oxide | ZnO | 2.1 |
| Silicon nitride | $Si_3O_4$ | 2.02 |
| Indium oxide | $In_2O_3$ | 2.0 |
| Silicon monoxide | SiO | 1.97 |
| Hafnium oxide | $HfO_2$ | 1.91 |
| Yttrium oxide | $Y_2O_3$ | 1.9 |
| Aluminum oxide nitride | AlON | 1.79 |
| Magnesium oxide | MgO | 1.74 |

Through the choice of the type of microstructure, it is possible to set whether the first color is generated in the first or a higher diffraction order or in scattered light. Periodic or at least locally periodic microstructures generate the first color in the first or a higher diffraction order. Randomly arranged microstructures generate the first color in scattered light.

In the theoretical description and the practical understanding of the interaction of diffractive microstructures (e.g. diffraction gratings or scattering microstructures), which can also additionally be combined with a thin-film layer system, with light, there is a demand for an adequate theoretical or phenomenological description. In a precise manner, the interactions of such microstructures are described in full by the precise electromagnetic theory in the form of Maxwell's equations and the corresponding boundary conditions, i.e. diffraction efficiencies, wavefronts, electromagnetic field or intensity distributions, can be calculated if the respective systems are sufficiently known.

As a rule, however, this precise approach does little to cultivate understanding, which is why phenomenological descriptions are often additionally used within particular models. Here, there may be mentioned in particular: the Huygens principle of propagation (named after the Dutch physicist Christiaan Huygens) and Fresnel interference (named after the French physicist Augustin-Jean Fresnel). The grating diffraction occurring on periodic microstructures is a specific type of diffraction and can be understood phenomenologically as a combination of Huygens propagation and Fresnel interference.

Through the corresponding choice of the first distance, it is thus possible to generate, by constructive or destructive interference of the light reflected at neighboring element surfaces and base surfaces or transmitted through neighboring element surfaces or base surfaces, a color effect that can be recognized by a human observer.

The first distance is preferably chosen such that a color is generated, in particular the first color or the second color is generated, by interference of the light reflected at the base surface and the element surfaces in the zero diffraction order in incident light and/or by interference of the light transmitted through the element surfaces and the base surface with light passing through in the zero diffraction order.

Light which reaches the eye of an observer coming from the base surface passes through a different optical path length compared with light which comes from the element surfaces. The ratio of the surface of the base elements to the surface of the base surface determines the efficiency with which the light beams interfere with the different path lengths. This ratio thus also determines the strength of the color or of the color impression.

The zero diffraction order corresponds to direct reflection or direct transmission. Direct reflection appears for example when a light source is reflected in a mirror.

It has further been shown here surprisingly that the coloring of the light diffracted or reflected at the microstructure in the zero diffraction order and/or the diffracted or scattered light is strongly influenced, in particular a second color is generated in the zero diffraction order and/or a first color is generated in scattered light or in the first or a higher diffraction order. It hereby becomes possible to provide decorative elements with striking color effects which are further also characterized by a high level of protection against forgery.

The first distance is preferably set to achieve the respective desired first color when viewed in the first or a higher diffraction order or in scattered light. Here, the first distance is preferably chosen for effects in reflection to be between 150 nm and 1000 nm and further preferably between 200 nm and 600 nm. For effects with light passing through, the first distance is preferably chosen to be between 300 nm and 4000 nm and further preferably between 400 nm and 2000 nm. The distance to be set depends here on the refractive index of the material which is located between the two planes.

To achieve a uniform color impression, a good constancy of the structure height or of the distance is necessary. This distance preferably varies in an area with a uniform color impression by less than +/−50 nm, further preferably less than +/−20 nm, still further preferably less than +/−10 nm. The base surface and the element surfaces are thus preferably arranged parallel to each other such that the first distance and the second, third or fourth distance vary by not more than +/−50 nm, preferably less than +/−20 nm, further preferably less than +/−10 nm, in particular vary in the first area.

The base elements are preferably molded and arranged in the first area such that the incident light is deflected by the base elements by scattering and/or by diffraction out of the zero diffraction order such that in at least one viewing deviating from the zero diffraction order a first color different from the second color, in particular a color that complements the second color, is generated. The security element thus has, in the zero order, a second color impression and/or color effect when the security element is tilted. At the same time, in a viewing deviating slightly from the zero order the security element has a clearly visible first color impression and/or color effect when the security element is tilted. In many cases, this second color impression is the complementary color of the first color impression, as will be explained in detail further below.

The color which emits a (neutral) gray shade when mixed with the original color is called complementary. A color pair can be perceived here color-psychologically as complementary even if it is not so technically and physically (for instance in RGB values, R=red, G=green, B=blue). In this document, by complementary is meant the color-psychological aspect.

By color is further preferably meant a change in the spectrum of the incident or transmitted light in the visible wavelength range, for example a red or blue color impression in the case of a white light source.

The desired, more eye-catching color impression, relevant for the visual effect, here is preferably the first color impression.

Through the choice, as described above, of the relief shape of the base elements and the combination of the base elements with a base surface spaced apart according to the first distance, the color impression of the microstructure is set in the first or a higher diffraction order or in scattered light. Through the corresponding choice of the surface dimensions of the projection of the base elements onto the base plane and the spacing of the microstructures, as also explained in detail in the following with reference to several embodiment examples, it is brought about that, in addition to the color effect in the first diffraction order or in scattered light at the zero diffraction order, a color impression that is different from this and visible to a human observer, in particular a complementary color impression, is generated. The thus-provided optical effect clearly differs from the known color effects, which are generated for example by diffraction structures with rainbow effects, and is also suitable in particular because of its striking color change to a particular degree as a security feature, for example for use in ID documents or value documents.

The molding and arrangement of the base elements influences the distribution of the light in the zero diffraction order as well as in scattered light or in the first or higher diffraction order. The base elements are preferably molded and arranged in the first area such that at least 10% of the incident light, further preferably between 20% and 90% of the incident light and further preferably between 30% and 70% of the incident light is deflected out of the zero diffraction order, in particular is deflected by scattering or diffraction or refraction. Through such a molding and arrangement of the base elements, a particularly striking color change is achieved between the color impression appearing in the zero diffraction order and the color impression appearing in a viewing deviating from the zero diffraction order.

It has further been shown that the above-described color impressions occur particularly strongly when at least one lateral extension of the projections of the base elements onto the base plane is between 0.25 and 50 μm, preferably between 0.4 μm and 20 μm and further preferably between 0.75 μm and 10 μm, in particular all lateral extensions of the projection of each base element onto the base plane meet this condition.

By projection of a base element onto the base plane is meant here the surface covered by the base element and resulting when the base element is viewed perpendicularly to the base plane.

It is further advantageous to choose the minimum distance of neighboring base elements to be not larger than 500 µm, in particular to choose it to be between 0.2 µm and 300 µm, further preferably between 0.4 µm and 50 µm. It has been shown that in the case of such a choice of this parameter the above-described color impressions occur particularly strongly.

By spacing of neighboring base elements is meant here the distance between neighboring base elements in the base plane, i.e. the spacing of the projections of neighboring base elements onto the base plane. The minimum distance between neighboring base elements thus represents the minimum spacing of the projection of neighboring base elements onto the base plane, i.e. the minimum spacing of neighboring base elements resulting in top view perpendicularly to the base plane.

The average surface coverage of the base plane with the base elements in the first area or in a partial area of the first area is preferably chosen to be between 30% and 70%, further preferably between 40% and 60% and particularly preferably approximately 50%. It has been shown that with such a choice of the surface coverage the above-described color impressions occur particularly strongly.

By average surface coverage of the base plane with the base elements is meant here the surface proportion of the projections of the base elements onto the base plane in the total surface of the respective area.

The flank of the microstructure is preferably defined as the surface the height of which is at least 10% of the step height (spacing of the neighboring element surface from the neighboring base surface in a direction running perpendicular to the base plane) higher than the neighboring base surface and at least 10% of the step height lower than that of the neighboring element surface.

In the case of a two-dimensional structure with a period p and a surface area $\Delta f$ of the flank projected onto the base plane, the surface proportion of the flank projected onto the base plane is $$100\% \cdot 2 \cdot \frac{\Delta f}{p}$$

This surface proportion of the flanks is preferably smaller than 50%, further preferably smaller than 40%, still further preferably smaller than 30% and particularly preferably smaller than 20%. Furthermore, the surface proportion of the flank is preferably larger than 1%, further preferably larger than 3%. It has been shown that an increase in the surface proportion of the flanks leads to a reduction in efficiency and the colors additionally become more pastel-like, thus more impure or containing more white.

In order that the surface proportion of the flanks is smaller than XX %, the average flank angle $\gamma$ must meet the following condition:

$$\gamma \geq \arctan\left[\frac{h}{(100\% - 2 \cdot 10\%) \cdot XX\% \cdot p}\right]$$

If the surface proportion of the flanks of a 0.5 µm high structure e.g. is to be less than 20%, the flank angle must be larger than 72° in the case of a structure with a period of 1 µm, larger than 57° in the case of a structure with a period of 2 µm and larger than 32° in the case of a structure with a period of 5 µm.

The flank angle of the flanks of the base elements is preferably to be chosen to be larger than 70 degrees and further preferably larger than 80 degrees and particularly preferably approximately 90 degrees.

By the flank angle is preferably meant the angle enclosed by the flank of the base element with the base plane, relative to the area of the base plane oriented towards the base element.

The shape of the projection of the base element onto the base plane is preferably selected from the following shapes: circle, ellipse, square, rectangle, hexagon, polygon, characters, letters, symbol or microtext. The projection of one or more of the base elements onto the base plane is in each case preferably molded in the shape of a symbol or a letter or a microtext. An item of optical information hidden from the human eye without the use of an aid is hereby provided as an additional security feature.

The base elements are, as described in the following, preferably arranged pseudorandomly, periodically and isotropically or non-periodically, but following a predefined function.

According to a preferred embodiment example, the base elements are molded and arranged in the first area such that they scatter the incident light in at least one direction, preferably scatter in a scattering angle range of between 45 degrees and 5 degrees, further preferably between 30 degrees and 10 degrees, around the zero diffraction order. It has surprisingly been shown that, possibly because of the conservation of energy, the scattered light generated in this way by the microstructure displays a color which differs from the color generated in the zero diffraction order, in particular displays a color complementary thereto. The complementary color forms in particular when the microstructure is coated with a color-neutral material that intensifies the reflection (e.g. aluminum or ZnS). Color-reflecting materials such as e.g. copper lead to non-complementary color combinations.

By scattering angle range is meant here the angle range, around the zero diffraction order, in which the incident light in reflection or transmission is deflected out of the zero diffraction order by scattering. In the case of a scattering angle range of 30 degrees the incident light is thus deflected in an angle range of from plus 30 degrees to minus 30 degrees around the zero diffraction order by scattering and in the case of a scattering angle range of 10 degrees the incident light is deflected out of the zero diffraction order in an angle range of between minus 10 degrees and plus 10 degrees by scattering.

To achieve this effect, the molding and/or positioning of the base elements is preferably varied pseudorandomly in the first area or in at least one first partial area of the first area. It has been shown that through such a molding or arrangement of the base elements a corresponding scatter effect can be achieved in which the color generated in the zero diffraction order in transmission or in reflection differs from the color of the scattered light generated in reflection or transmission. The pseudorandom arrangement further suppresses or reduces undesired diffractive effects, with the result that particularly striking color changes can be provided.

For this, in the first area or in at least one first partial area of the first area, one or more of the parameters: positioning of the base element, spacing of the base element from the closest neighboring base element, size of the shape and/or surface area of the projection of the base element onto the base plane, number of vertical steps of the base elements and lateral preferred direction of the projection of the base element onto the base plane of the base elements arranged in the first area or in the at least one first partial area, is preferably varied pseudorandomly within a variation range in each case predefined for the first area or the respective first partial area. It is advantageous here if the parameters cannot adopt all possible values, but can only adopt values from a narrower, predefined variation range.

It has further proved worthwhile if the predefined variation ranges in each case comprise a set of predefined values, preferably comprise between 5 and 20 values. Thus, not all numerical values comprised by the variation range can be selected pseudorandomly, but only the values predefined for the respective variation range.

It is further possible for all values of the variation range to be selected pseudorandomly with equal probability. However, it is also possible and preferred for the values of the variation range to be selected pseudorandomly with a probability according to a function, in particular a Gaussian function or an inverse Gaussian function. It has been shown that, through such a selection, the striking quality of the color impression can be further improved.

The variation ranges for the above-described parameters are preferably chosen as follows:

Variation range for the parameter positioning of the base element: deviation of from +/−0.5 µm to +/−30 µm and further +/−1 µm to +/−10 µm from the respective normal position.

Variation range for the parameter spacing of the base elements from the closest neighboring base element: 0.2 µm to 500 µm, further preferably 0.4 µm to 50 µm and further preferably 0.5 µm to 10 µm.

Variation range of the parameter shape of the projection of the base element onto the base plane: selection from a predefined store of shapes comprising for example letters, different symbols, or for example a circle, a square and a rectangle. The arrangement of the different shapes can be random, but there can also be a local grouping of the different shapes.

Variation range of the parameter size of the surface area of the projection of the base element onto the base plane: variation of at least one lateral dimension of the projection of the base element onto the base planes in a variation range of from 0.5 µm to 30 µm and further preferably from 1 µm to 10 µm.

Variation range of the parameter lateral preferred direction of the projection of the base element onto the base plane: angle range of from +180 degrees to −180 degrees, angle range of from +90 degrees to −90 degrees, angle range of from +30 degrees to −30 degrees.

It is further advantageous if, for each of the base elements arranged in the first area or in the first partial area, an angular position of the respective base element in the base plane is defined by a two-dimensional grid spanned by the coordinate axis x and the coordinate axis y.

It is further advantageous to vary the parameter "positioning of the base element" pseudorandomly here according to the following approach: the position of the base elements in the first area or in the first partial area is then determined by a pseudorandom shift of the base element out of the respective normal position in the direction of the direction determined by the coordinate axis x and/or the coordinate axis y. Here, the normal position preferably relates to the centroid of the projection of the respective base element onto the base plane.

It is further also possible to vary the parameter "positioning of the base element" pseudorandomly by any other pseudorandom arrangement of the base elements.

The variation range of the random shift out of the normal position is preferably between +D/2 and −D/2, wherein D is the dimension of the projection of the base element onto the base plane in the direction of the coordinate axis x or the coordinate axis y. The grid width of the grid is preferably chosen to be between 0.5 µm and 100 µm, further preferably between 1.5 µm and 20 µm.

According to a further preferred embodiment example of the invention, the parameters which are varied pseudorandomly in a first of the first partial areas and in a second of the first partial areas are chosen to be different and/or at least one variation range of the varied parameters is chosen to be different in a first of the first partial areas and in a second of the first partial areas. Through the different variation of the parameters which are varied pseudorandomly and/or the different variation ranges, a different scattering of the light can be brought about in the first of the first partial areas and the second of the second partial areas, with the result that different color effects are generated in the first of the first partial areas and in the second of the second partial areas by a tilting out of the zero diffraction order and thus these areas can be differentiated. The different variation of the parameters can, however, also be chosen such that color effects that appear the same to the human eye are generated in the first of the first partial areas and in the second of the second partial areas by a tilting out of the zero diffraction order, but the differences are detectable under a microscope. For example, a text or a pattern can be formed through the partial areas, which becomes visible under a microscope. This can be used as a concealed feature.

The shape of the projection of the base elements onto the base surface preferably differs from two or more base elements in the first area or in the first partial area.

One or more of the base elements are preferably formed as symmetrical base elements. By symmetrical base elements is meant here base elements in which the projection of the base elements onto the base plane has a symmetrical shape, i.e. base elements which are symmetrical with respect to the shape of their projection. Examples of this are circles, squares, equilateral triangles, etc.

It is further advantageous if one or more base elements are asymmetrical or anisotropic base elements. By asymmetrical or anisotropic base elements is meant base elements in which the projection of the base element onto the base plane has an asymmetrical shape with a lateral dimension in a preferred direction which is larger than the lateral dimension of the projection transverse to the preferred direction. By asymmetrical or anisotropic base elements is thus meant base elements with an asymmetrical shape of the projection of the base element onto the base plane. Examples of this are ellipses, rectangles or equilateral triangles.

The lateral dimension of the projection in the preferred direction is preferably more than 2 times larger, preferably more than 5 times larger, than transverse to the preferred direction.

The use of asymmetrical or anisotropic base elements makes it possible to achieve a scattering angle range dependent on the illumination and viewing. The scattering angle range is dependent, among other things, on the respective structure size of the base element in the illumination/viewing direction. This has the result that the color impression of the scattered light changes when the security element is rotated in the base plane while maintaining the viewing angle. For example, in the case of viewing in the plane spanned by the coordinate axes x and z the scattered light can appear cyan-colored or light blue or turquoise and in the case of a rotation in the base plane into the y/z plane can change to a dark bluish light or a dark gray color impression. Through the different scattering behavior of the asymmetrical base elements in the preferred direction and transverse to the preferred direction, it is thus ultimately brought about that the color impression, in particular the brightness or intensity of the color, changes when the decorative element is rotated around an axis perpendicular to the base plane.

According to a preferred embodiment example of the invention the base elements in the first area or in a partial area of the first area are asymmetrical base elements which have the same preferred direction. The above-described color effect thus appears in the first area or in this partial area.

According to a further preferred embodiment example the base elements in the first area or in a partial area of the first area are asymmetrical base elements the preferred direction of which is varied pseudorandomly in a predefined variation range. Through such a design, firstly, an enlargement of the scattering angle range can be achieved and, depending on the selection of the variation range, the above-described color effect can be observed at a particular angle. The variation range is preferably formed by an angle range of from plus 180 degrees to minus 180 degrees or plus 90 degrees to minus 90 degrees to achieve the above-described first effect and by an angle range of from less than plus 90 degrees to minus 90 degrees, for example plus 30 degrees to minus 30 degrees, to achieve the second, above-described effect.

According to a further preferred embodiment example of the invention one or more first cells and/or one or more second cells are provided in the first area or in the first partial area of the first area. The base elements arranged in the first and second cells are formed as asymmetrical base elements. The asymmetrical base elements of the first cells here have a uniform first preferred direction and the asymmetrical base elements of the second cells have a second uniform preferred direction. The first and second preferred directions are chosen to be different and preferably differ by at least 5 degrees, further preferably by at least 10 degrees.

When the decorative element is rotated around an axis perpendicular to the base plane, the effect already described above is generated in the first and second cells. If the first and second cells are chosen to be in the macroscopic range in terms of their dimension, i.e. the lateral dimensions of the first and second cells parallel to the base plane are chosen to be larger than 300 µm, then when the decorative element is rotated around an axis perpendicular to the base plane the shape of the first and second cells becomes visible to the observer (in the case of a corresponding tilt out of the zero order), with the result that an item of information determined by the molding of the first and second cells, e.g. a denomination, becomes visible.

In an alternative embodiment with cells having dimensions in the macroscopic range, movement effects are produced in the case of rotation, e.g. rolling bar effects are produced. To produce a "rolling bar" effect, it is possible for example to place several elongate cells with the asymmetrical base elements next to each other, wherein the preferred direction of the base elements varies continuously from cell to cell, for example increases in steps of 10 degrees, preferably in steps of at most 5 degrees. The size of the elongate cells is, for example, 20 mm in the longitudinal direction and 500 µm in the transverse direction. If 19 such cells are arranged next to each other, wherein the preferred direction of the first cell is 0 degrees and the preferred direction of the other cells increases in steps of 10 degrees, then the preferred direction of the middle cell is 90 degrees and that of the last cell is 180 degrees (or 0 degrees again). If a decorative element of such an embodiment is now viewed at a suitable fixed tilt angle and then rotated, the brightness of the color impression varies, like a band of light, over the decorative element.

A "rolling bar" effect is an optical effect similar to a reflective cylinder lens. In the process the areas of the cylinder lens which reflect the light in the direction of an observer appear brighter than the areas which reflect the light in other directions. Thus, this function produces a kind of "light band" which appears to move over the cylinder lens when the multi-layer body is tilted in the direction of the angle of view.

It is further also possible to choose the size of the first and second cells such that they have a lateral dimension parallel to the base plane of less than 300 µm, in particular less than 100 µm. The effects generated by the first and second cells hereby mix with each other for the human observer in the case of a viewing without an aid, with the result that the first and second cells cannot be differentiated by him and a color impression appears in the case of a rotation around an axis perpendicular to the base plane, which color impression results from a color mixing of the color effects generated in the first and second cells. Firstly, more interesting color effects can hereby be generated in the case of rotation. Further, the division, not visible to the human observer, into first and second cells can serve as an additional, concealed security feature which can be checked for example only with the aid of a microscope.

Further, it is also possible for the first area or the first partial area of the first area to have one or more third cells, and for the base elements arranged in the third cells to be symmetrical base elements. Depending on the choice of the size of the third cells, because of the different scattering behavior of the third cells, in the case of a corresponding combination with first and second cells, the two above-described effects can be provided supplemented by a further design feature and thus the attractiveness of the decorative element can be further improved.

Further, it is also possible to combine the above-described effects with each other and to provide, for example, in a first of the first partial areas, first, second and third cells which have a macroscopic lateral size dimension and to provide, in a second of the first partial areas, first, second and third cells which have at least one lateral dimension parallel to the base plane of less than 300 µm, in particular less than 100 µm.

According to a further preferred embodiment example of the invention, in the first area or in one or more second partial areas of the first area, the base elements follow each other periodically at least in areas, in particular with a period of between 0.75 µm and 10 µm to each other. The base elements are thus preferably positioned according to a regular one- or two-dimensional grid.

The base elements are further preferably molded identically in the first area or in the one or more second partial areas and in particular have an identical shape with respect to their projection onto the base plane.

The azimuth angle of the base elements in the first area or second partial area is determined by the direction in which the base elements follow on from each other periodically, and the period of the base elements in the first area or second partial area is determined by the spacing between the centroids of the projection of the base elements onto the base plane. The microstructure can thus be built up for example of bar-shaped, punctiform or rectangular base elements (when viewed perpendicular to the base plane) which are aligned isotropically or pseudo-isotropically according to an azimuth angle.

According to a further preferred embodiment example it is further possible for the base elements to have a circular ring shape, when viewed perpendicular to the base plane, and to form a circular grid.

According to a preferred embodiment example of the invention the decorative element has one or more cells with in each case several second partial areas in which the base elements in each case follow on from each other periodically. The sequence of the base elements in each of these second partial areas is here defined by the parameters: azimuth angle and/or base element shape and/or spatial frequency. One or more of the parameters azimuth angle and/or base element shape and/or spatial frequency of the partial areas arranged in the cell are varied pseudorandomly from second partial areas to second partial areas within a variation range predefined for the cell.

The second partial areas preferably have in each case at least one lateral dimension parallel to the base plane of between 5 µm and 100 µm, preferably 10 µm and 50 µm. The cells preferably have at least one lateral dimension parallel to the base plane of between 40 µm and 300 µm, preferably between 80 µm and 200 µm.

In the second partial areas, the light is thus diffracted differently in different directions. Because of the specific design of the microstructure, the diffracted light here does not have the typical rainbow color effect or at least has it only significantly weakened. Instead, because of the conservation of energy, the diffracted light displays a coloring, which usually has the complementary color impression compared with the light beam which is reflected or transmitted in the zero order. Through the specific design and positioning of the base elements arranged in the cells, a correspondingly wide deflection of the light out of the zero diffraction order, and thus a similar effect to the one in the case of the previously described scattering of the light at the base elements, is furthermore brought about.

The parameter azimuth angle is preferably varied in a variation range of from minus 180 degrees to plus 180 degrees, minus 90 degrees to plus 90 degrees or minus 30 degrees to plus 30 degrees, preferably varied in steps of 15 degrees. Through the choice of the variation range of from minus 90 degrees to plus 90 degrees, similar effects can be achieved by the cells, as described by the arrangement of symmetrical base elements in the previously mentioned third cells. If the variation range of the azimuth angle is chosen to be smaller than plus 90 degrees to minus 90 degrees, similar optical effects can be brought about by the cells, as described previously by means of asymmetrical microstructures in the first and second cells. The previous statements with respect to the size dimension of the cells and the combination of different cells with regard to the first, second and third cells are thus likewise applicable in this embodiment example and, in this regard, reference is thus made to the previous statements.

According to a further preferred embodiment example of the invention, in the first area and/or in one or more third partial areas of the first area, the base elements are positioned following a non-periodic function. In this embodiment the color effect appearing in the case of a viewing in the zero diffraction order and in the case of a viewing in a viewing direction deviating from the zero diffraction order is preferably determined by the first distance and the specific relief shape of the base elements and the position and the viewing angle range, at which the first, in particular complementary, color is generated, are determined by the non-periodic function.

A decorative element according to the invention formed as set out above is preferably formed as described in the following:

Hot-stamping film, vapor-deposited with approx. 30 nm Al. The microstructures are preferably embedded in polymer with a refractive index $n_1$ of approx. 1.5

Circular random structures with a lateral extension of the projections of the base elements of 2.5 µm and a first distance of 300 nm. Average surface coverage is 50% and flank angle is close to 90 degrees. These structures lead for example to a violet first color impression in scattered light and a greenish second color impression in the zero diffraction order.

According to a preferred embodiment the arrangement of the base elements and the surface dimension of the projection of the respective base elements in the first area or in the third partial area are determined by a function f (x,y) which describes a binary diffraction structure which deflects the incident light to generate a first item of information by diffraction, preferably by diffraction in the first diffraction order. The first distance, ascertained as described above, or a multiple of the first distance and not the relief height "normally" to be provided for the binary diffraction structure is chosen as the spacing of the element surfaces of the base elements from the base surface, with the result that an item of color information determined hereby is generated in the first area or the third partial area as the second item of information. The binary diffraction structure is thus combined with a structure depth which is significantly enlarged compared with the structure depth usually used for diffraction structures and which is chosen as set out above and thus generates an additional item of color information in the first diffraction order and in the zero diffraction order, as set out above.

The binary diffraction structure deflects the light preferably according to a predefined, freely choosable, three-dimensional free-form surface with one or more free-form elements. The free-form elements here are preferably selected from: free-form elements in the form of a section of a surface of a three-dimensional object, free-form elements producing a lens-like magnification, demagnification or distortion effect in the form of an alphanumerical character, a geometric figure (e.g. cylindrical lens or round lens) or another object, e.g. a logo, a number or a letter.

Giving such a free-form surface a defined color results not only in a simple coloring, but in a visually very attractive interplay of color effect with the three-dimensional effect of the free-form surface, similar to the naturally occurring structural color effects that sometimes appear metallic on certain butterfly wings (e.g. Blue Morpho didius). This interplay of color effect and three-dimensional free-form surface effect is very important for the visual perception.

Further, it is also possible to achieve the following additional advantageous effects through a corresponding modification of such a microstructure generated by a free-form surface:

It is advantageous to combine the free-form surface effect with color variations or color gradients, e.g. "blue to green". To achieve this effect, as will be explained in general further below, the spacing of the element surface of the base elements from the base plane is chosen to be different in areas, for example in particular also varied linearly according to the color gradient to be achieved.

It is further possible to overlay the free-form surface effect with an item of color information, thus to encode an additional item of information for example in the area of the free-form surface effect, for example a red "OK" on a green background. In a pattern image which is molded in a pattern, for example in the form of the "OK", for this the spacing of the element surfaces of the base elements from the base surface is chosen to be different from the spacing of the element surfaces of the base elements from the base surface in the background area.

It is further advantageous if the free-form surface effect appears in different colors in different partial areas, for example appears in "blue", "green" and "red", preferably also in combination with a referenced printed ink which is applied for example in offset or intaglio printing. For this, the spacing of the element surfaces of the base elements from the base surface is also chosen to be correspondingly different in the different partial areas. Such a design of the microstructure is preferably also chosen in combination with referenced optically variable inks (OVI, Spark, etc.). It is preferred to carry out the arrangement of these optically variable inks registered, i.e. positionally accurate, relative to the partial areas. Further, it is also advantageous to use such a design of the microstructure in combination with an in particular metallic reflective layer provided only in areas, wherein the reflective layer is preferably arranged registered, i.e. positionally accurate, relative to the partial areas.

Furthermore, it is also possible to vary the above-described microstructure providing a three-dimensional free-form surface effect locally in the distance between the element surfaces and the base surface as described in the following, in order for example to combine the free-form surface effect with a multi-color image or true-color image.

Further, a decorative element according to the invention with a microstructure that generates a free-form surface effect and which is preferably formed as set out above is preferably designed as follows:
- hot-stamping film, vapor-deposited with Al/Cu/Cr etc. or ZnS or alternative materials; or also with HRI/metal combinations (e.g. ZnS/(Al)
- free-form surface effect (Surface Relief Effect), i.e. diffraction structures which simulate a macroscopic free-form surface, in combination with other visual effects
- free-form surface effect (Surface Relief Effect), i.e. diffraction structures which simulate a macroscopic free-form surface, with a binary grating structure in which the periodicity/orientation varies according to a predetermined function, with the aim of visualizing a three-dimensionally prominent element.
- spacing of the element surfaces from the base surface of between 150 nm and 500 nm, covered with a material having a refractive index of between 1.4 and 1.7.

It is further advantageous if the arrangement of the base elements and the surface dimension of the projection of the respective base elements are chosen according to a function which results from the binarization of a function of a hologram, a computer-generated hologram or a kinoform, and in which the first distance or a multiple of the first distance is chosen as the spacing of the element surfaces of the base elements, as stated above. Here too, the color information is determined by the first distance and the viewing angle ranges at which these color effects occur are determined by the deflection of the light by diffraction determined by the function. For the binarization, e.g. the function which describes for example the relief height h as a function of the x and y coordinates, i.e. h=F(x, y), is compared with a threshold value or limit value $h_S$ and base elements, provided in the areas of the base plane, in which h≥$h_S$. The spacing of the element surface of the base elements from the base surface here is determined by the first distance and not by h or $h_S$. Such a decorative element displays, on the one hand, the first color impression defined by the first distance in scattered light or in light diffracted according to the hologram function as well as the second color impression in the zero diffraction order. On the other hand, above all in the case of illumination with strongly directional light, in particular laser light, it additionally displays a reconstruction of the hologram. In this way, a concealed security feature can be integrated directly into the surface of the decorative element which has the color effect. It is also possible to choose the image of a homogeneous surface as hologram. This leads to a homogeneous color surface similar to that in the case of the random structures. However, the arrangement of the base elements in this case is not pseudorandom or random, but follows a function. The homogeneous color surface here can also project forwards or backwards from the plane of the decorative element if the image of the surface from which the hologram was calculated was in front of or behind the hologram plane.

According to a further preferred embodiment example of the invention the microstructure has base elements with different spacing of the element surface from the base surface in relation to a direction perpendicular to the base plane.

In one or more second and/or third zones of the first area, the element surfaces of the base elements and the base surface are thus preferably spaced apart in a direction running perpendicular to the base plane in the direction of the coordinate axis z by a second or third distance respectively which differs from the first distance and is chosen such that a third or fourth color which differs from the first color or second color is generated in the one or more second or third zones in particular by interference of the light reflected at the base surface and the element surfaces in incident light in the first diffraction order or in scattered light or in the zero diffraction order and/or in particular by interference of the light transmitted through the element surfaces and the base surface with light passing through in the first diffraction order or in scattered light or in the zero diffraction order. In addition to such second or third zones, still further zones can also be provided, in which the element surfaces of the base elements are spaced apart in a direction running perpendicular to the base plane in the direction of the coordinate axis z by one or more further distances which differ from the first, second and third distance and are chosen such that corresponding further colors which differ from the first, third and fourth color are generated in the one or more further zones in particular by interference of the light reflected at the base surface and the element surfaces in incident light and/or in particular by interference of the light transmitted through the element surfaces and the base surface with light passing through. The second, third and further distance is set, as set out above, to achieve the respective color in the case of a viewing in the zero diffraction order or to achieve a corresponding (complementary) color in a viewing direction deviating from the zero diffraction order, wherein the second, third and further distance is preferably chosen to be between 150 nm and 1000 nm, preferably between 200 nm and 600 nm (preferred for effects in incident light). For effects with light passing through, the second, third and further distance is preferably chosen to be between 300 nm and 4000 nm, preferably between 400 nm and 2000 nm.

Through such a design of the microstructure, different color impressions can be generated in the first area both when viewed in the zero diffraction order and when tilted, whereby a further class of color effects is provided by the decorative element as a security feature.

According to a preferred embodiment example the one or more first, second, third and further zones here are in each case molded such that they have lateral dimensions parallel to the base plane in the macroscopic range and in particular have lateral dimensions, for example width and length, of more than 300 µm, preferably between 300 µm and 50 mm. Through the molding of these first, second, third, fourth and/or further zones as patterns and/or background areas, an optically recognizable item of information can thus be provided in the first area by the microstructures which become visible in particular when viewed in the zero diffraction order and/or when specifically tilted out of the zero diffraction order.

The surface coverage of the respective zones with the base elements is preferably varied locally in the one or more first, second and/or third zones. Such a variation of the surface coverage here makes it possible to modulate the color brightness value of the respective zone locally and additionally to provide for example an item of information in the manner of a grayscale image.

According to a further embodiment example of the invention one or more of the first, second, third and/or further zones have at least one lateral dimension parallel to the base plane of less than 300 µm, preferably between 20 µm and 250 µm, further preferably between 30 µm and 150 µm. Through such a design of the zones, numerous optical effects can be generated which are generated in particular by additive color mixing of the zones produced by the first, second, third and/or further zones.

It is thus possible for example for the surface coverage of the respective zones with the base elements to be chosen to be different in one or more of these first, second, third and/or further zones, in order thus to achieve a different color brightness of the respective zones. Two or more of the first, second, third or further zones thus differ in terms of the surface coverage of the respective zone with the base elements and thus have a different color brightness, although they have the same color value.

It is further advantageous to provide one or more fourth zones with a microstructure, in which zones the microstructure is formed by a moth eye structure, and to arrange the zones provided with the moth eye structure and first, second, third and/or further zones next to each other in order thus to achieve a variation of the color brightness locally. Diffraction structures with a spacing of the structure elements below the wavelength of visible light, preferably below 400 nm, are preferably used here as moth eye structures. These structures are preferably provided by cross gratings or hexagonal gratings with a period in the range of from 200 nm to 400 nm and a grating depth/period ratio of between 0.5 and 2.

According to a further preferred embodiment example of the invention first, second, third and/or further zones are used to generate a multi-color or true-color image. For this, a starting image is preferably divided into a plurality of image point areas. An allocated color value and an allocated color brightness value are determined for each of the image point areas of the starting image. An allocated image point area is provided in the decorative element for each of the image point areas of the starting image, wherein each image point area has at least one lateral dimension parallel to the base plane of less than 300 µm, in particular less than 150 µm. The image point areas of the decorative element are in each case covered with one or more zones selected from first, second, third, fourth and further zones. The selection of the zones and of the surface proportions of the respective zone at the image point area here is chosen such that, for a defined angle of view (e.g. 25 degrees), the allocated color value and color brightness value of the image point area result. The color value of at least one image point area of the decorative element preferably results here by additive color mixing of the colors generated by two or more different zones of the microstructure which are arranged in the image point area. The surface proportion of these zones in the image point area here determines the color value of the respective image point area. The total surface area of these zones and/or the surface proportion of the zones covered with the moth eye structures determines the color brightness value of the respective image point area.

If asymmetrical base elements are selected as base elements in at least one of the first, second, third, fourth and/or further zones, the color impression of the respective image point area, and thus the appearance of the multi-color image, varies in the case of rotation around an axis perpendicular to the base plane. The preferred direction of the asymmetrical base elements can be the same in all zones with asymmetrical base elements, but it can also vary. It is hereby possible to generate in the image area, by the microstructure, a corresponding multi- or true-color image which appears dynamic in the case of rotation. When rotated, the image can become lighter or darker for example or it can change from true colors to false colors or at least falsified colors.

The first, second, third and/or further zones of the first area can overlap as desired with the above-described first partial areas, second partial areas, third partial areas and cells. The molding of the projection of the respective base element onto the base plane and the arrangement of the base elements on the base plane are determined according to the above explanations regarding the first, second and third partial areas and cells. The distance of the element surface from the base plane is chosen in respect of the respective zone, and thus for example the first distance, the second distance, the third distance, or the further distance is chosen for this. Further interesting combination effects which further increase the protection against forgery result hereby.

It is particularly advantageous here to arrange the first, second and third cells in each case overlapping with first, second and third zones, and thus to space apart the element surfaces of the base elements and the base surface in a direction running perpendicular to the base plane by the first distance in the one or more first cells, by the second distance in the one or more second cells and by the third distance in the one or more third cells. Further, it is also possible to form only a part of the first, second and third cells as first zones, a part of the first, second and third cells as second zones and a part of the third cells as first, second and third zones, in order thus to provide for example multi-color images that change with the viewing angle or multi-color images that change when rotated around a perpendicular line relative to the base plane of the axis. Further, several second partial areas can thus also be provided in a cell, which partial areas are formed as different first, second, third and/or further zones and thus differ in each case in terms of the spacing of the element surface from the base surface. Through the additional additive color mixing, interesting color change effects also result here depending on the choice of the variation ranges of the parameters. Further, the first item of information can also be overlaid with an item of multi-color information for example by the corresponding superimposition of a third partial area by first, second, third and/or further zones, whereby striking color effects result.

According to a further preferred embodiment example of the invention it is possible to form the microstructure in the first area not only with two steps, but also with several steps in order to increase the color purity. Thus, one or more of the base elements preferably have one or more further element surfaces which in each case run substantially parallel to the base surface. The one or more further element surfaces are spaced apart from the base surface in the direction of the z axis by a multiple of the first distance when the base element is arranged in one of the first zones, by a multiple of the second distance when the base elements are arranged in one of the second zones and by a multiple of the third distance when the base element is arranged in one of the third zones, correspondingly are spaced apart by the further distance in the case of an arrangement in the further zone. The more steps the base elements have, the purer or stronger the color impression is. The higher color purity of base elements with several steps is helpful in particular for decorative elements with color mixing and true-color images. For a color impression that is as strong as possible or a color purity that is as high as possible, it is advantageous if the surface area of all element surfaces of the base elements is approximately equally large.

It is further advantageous to form the element surfaces and the base surface slightly tilted relative to each other, in particular to form them tilted relative to each other by between 5 degrees and 30 degrees, further preferably between 5 degrees and 15 degrees. The color spectrum and the scattering angle range can hereby be broadened. However, a tilt that is too great weakens the color effect. Tilting is more suitable for binary base elements (base elements with two steps) than for base elements with several steps.

It is further advantageous to modulate, in the first area or in a fourth partial area of the first area, the element surface to provide a concealed item of information which is readable in particular by means of a laser or by means of a polarizer. It is thus possible for example to modulate the element surfaces according to the surface of a hologram which displays its information only when irradiated with a laser, in order thus to provide a concealed item of information. Further, it is also possible to modulate the element surface and/or base surface with a diffraction grating having a grating period of between 100 nm and 2000 nm, further preferably between 200 nm and 500 nm, in order thus to introduce an item of information that can be read by means of a polarizer. The modulation depth of the hologram or of the diffraction grating is preferably smaller than 100 nm, particularly preferably smaller than 50 nm and further preferably smaller than 30 nm. The modulation thereby only slightly disrupts the interference which produces the color effect.

The term "element surface running substantially parallel to the base surface" means in this connection that the spacing of the element surface to the base surface over the area of the element surface runs in a value range such that, as already stated above, a color is generated, as has been explained above, by interference of the light reflected at the element surface and the base surface or light transmitted through these in the zero diffraction order. For this, the spacing of the element surface of the base element from the base surface preferably varies in the direction of the z axis by not more than 20%, further preferably not more than 10%, from its average value.

According to a preferred embodiment example of the invention the microstructure is molded at least in areas between a first layer of the decorative element and a second layer of the decorative element, wherein the first layer is a transparent layer with a refractive index $n_1$ and the second layer is a reflective layer, in particular a metal layer is an HRI layer (HRI=High Refractive Index) or a reflective multi-layer system. The metal layer can be opaque or semitransparent. The material of the metal layer can be very reflective (e.g. aluminum or silver) or also partially absorptive (e.g. copper or chromium). Through a skillful choice of the material of the reflective layer, the color effect can be made even more clearly visible.

By transparent layer is meant here a layer having a transmission of at least 50%, further preferably of at least 80%, in the visible wavelength range.

If such an element is viewed in reflection, the first, second or third distance is preferably determined by the refractive index $n_1$ multiplied by the optical distance which is determined by the fulfillment of the $\lambda/2$ condition with for a wavelength $\lambda$ in the range of visible light. However, the viewing angle must be taken into account here.

Further, it is also possible for the microstructure to be molded at least in areas between a first layer of the decorative element and a third layer of the decorative element, wherein the first layer is a transparent layer with a refractive index $n_1$ and the third layer is a transparent layer with a refractive index $n_2$, and wherein the refractive index $n_1$ and the refractive index $n_2$ differ by at least 0.2, preferably differ by between 0.4 and 1.5. If such a microstructure is viewed in transmission, the first distance, the second distance or third distance is preferably determined by the equation $$\lambda = \frac{|n_1 - n_2| \times h}{\cos(\alpha)}$$

According to a further preferred embodiment example of the invention the microstructure has a second area in which the microstructure is formed in the form of a linear or crossed sine-wave or rectangular diffraction grating, a 2D/3D or 3D hologram, a Kinegram®, a microlens structure, a colored or achromatic blazed grating, a macrostructure, an isotropic or anisotropic matt structure, a combination of the above structures, a volume hologram, a thin-film color system or the like, which generates a further optically recognizable item of information. The items of optical information generated by the first area and by the second area preferably have items of information that supplement each other or are related to each other, whereby forgery attempts are immediately recognizable. The first and second areas can be interlaced for example like a mosaic. The second area, however, can also be arranged in the form of thin lines, e.g. guilloches, over the first area, etc. The second area can also be a surface printed in one or more colors.

The decorative element is preferably formed in the form of a transfer film, a laminating film, a security thread or a label. The decorative element thus has, in addition to the microstructure, preferably also one or more plastic layers and/or paper layers, adhesive layers, adhesion-promoter layers and also further decorative layers, which preferably provide still further items of information in the decorative element.

The decorative element can be used to create a particularly good protection against forgeries. It is used on security documents such as banknotes, credit cards, passport documents, identification cards, etc. in order to make imitation difficult. Decorative elements with a diffractive structure can also be integrated into a credit card, an ID card, into a passport document, an identification card, etc. within the framework of a layer structure. Adhesive labels with holograms are located on commercial products or goods to be protected. Packaging for commercial products or goods to be protected or print products are also provided with such decorative elements, as protection against forgery and/or as a decoration element to provide a decorative effect.

BRIEF DESCRIPTION OF THE DRAWINGS

The invention is explained by way of example below with reference to several embodiment examples with the aid of the attached drawings.

FIG. 1b shows a schematic sectional representation of the security document according to FIG. 1a.

FIG. 1c shows a schematic sectional representation of a section of the decorative element according to FIG. 1a.

FIG. 2a and

FIG. 5a shows a schematic top view of an area of a microstructure with several asymmetrical base elements.

FIG. 5b shows a schematic top view of an area of a microstructure with several asymmetrical base elements.

FIG. 5c shows a schematic top view of an area of a microstructure which has partial areas with differently oriented asymmetrical base elements.

FIG. 5d shows a schematic top view of an area of a microstructure with asymmetrical and symmetrical base elements.

FIG. 6a and

FIG. 6b in each case show a schematic representation of an area of a microstructure with asymmetrical base elements in different illumination and/or viewing directions.

FIG. 8b shows a schematic sectional representation of the microstructure according to FIG. 8a.

FIG. 9b shows a schematic representation to illustrate the structure of the microstructures in the area of the cell according to FIG. 9a.

FIG. 11b shows a schematic sectional representation of a decorative element in the area of the section according to FIG. 11a.

DETAILED DESCRIPTION OF THE INVENTION

Figure 1A:
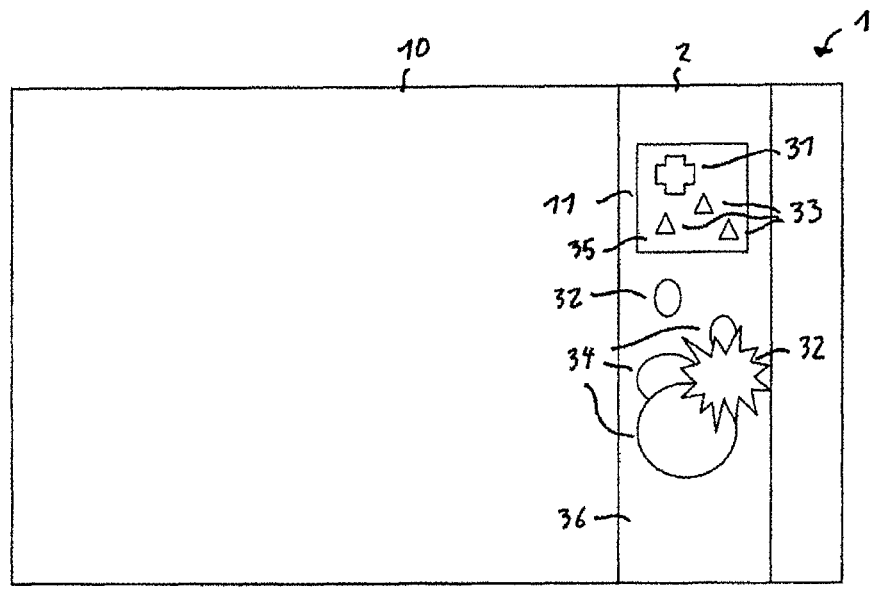
FIG. 1a shows a schematic top view of a security document with a decorative element.
Figure 1B:
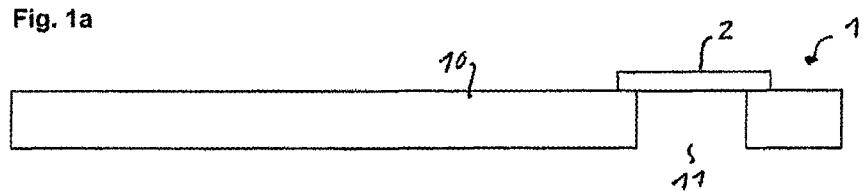

FIG. 1a and FIG. 1b show a top view and a sectional representation respectively of a security document 1 which is provided with a decorative element 2.

The security document 1 in the embodiment according to FIG. 1a and FIG. 1b is a banknote. However, it is also possible for the security document 1 to be any other security document, for example an ID document, such as an identification card, a passport or a corporate identification card, a credit card or prepaid card, a software certificate, an adhesive security label for product protection or a security label.

The security document 1 has a carrier substrate 10 to which the decorative element 2 is applied. The carrier substrate 10 here preferably consists of a paper substrate. However, it is also possible for the carrier substrate 10 to consist of a plastic substrate or of a multi-layered substrate with one or more plastic and/or paper layers. Further, it is also possible for security features, for example watermarks or micro perforations, to be introduced into the carrier substrate 10, and for the carrier substrate 10 to be provided with further decorative elements, overprints and the like, which provide further security features.

The decorative element 2—as shown in FIG. 1a—has a strip-like shape and spans the whole width of the carrier substrate 10 from the upper longitudinal edge of the carrier substrate to the lower longitudinal edge of the carrier substrate. In the carrier substrate 10, a transparent window 11 is further introduced which is covered by the decorative element 2. The transparent window 11—as shown in FIG. 1b—can be realized in the form of a hollow in the carrier substrate 10 which is introduced into the carrier substrate 10 for example through a corresponding imprint or a corresponding watermark. However, it is also possible for the transparent window 11 to be formed by a transparent area of the carrier substrate, in particular when the carrier substrate consists of a transparent plastic substrate.

The decorative element 2 now has several areas in which an optical effect is generated by the decorative element 2 in incident light or with light passing through. For a start, of these areas, areas 31 and 33 are shown in FIG. 1a, which are arranged in the area of the transparent window and which generate an optical effect when viewed with light passing through. FIG. 1a further shows areas 32 and 34 in which an optical effect is generated when viewed in incident light, i.e. in reflection. The areas 31 and 33 are further surrounded by a background area 35 in which the decorative element 2 displays a transparent appearance for example when viewed with light passing through. The areas 32 and 34 are further surrounded by a background area 36 in which the decorative element 2 displays an optical effect in reflection, for example displays a metallically glossy or matt or also colored appearance.

In the area 31, 32, 33 and 34 the decorative element 2 has a microstructure which generates an optical effect in incident light or with light passing through, as described above. The microstructure here has, in the areas 31 and 32, a specific design and comprises a base surface and several base elements which in each case have an element surface raised and lowered compared with the base surface and a flank arranged between the element surface and the base surface. The precise design of the microstructure in the areas 31 and 32 is explained in detail in the following with reference to FIG. 1c to FIG. 16.

In the area 33 and 34, the microstructure is molded in the form of a diffraction grating, a hologram, a KINEGRAM®, a microlens structure, a blazed grating, a macrostructure or another relief structure differing from the formation of the microstructure in the area 31 and 32, with the result that the decorative element 2 produces different optical effects, in particular different optically variable effects, in the areas 31 and 32 on the one hand and in the areas 33 and 34 on the other hand. The areas 32 and 34 and, where appropriate, also the areas 31 and 33 are preferably arranged—as indicated in FIG. 1a—next to each other and preferably form representations that supplement each other and/or are interlaced like a mosaic, in order thus to further increase the protection against forgery.

The arrangement of the areas 31 and 33 in the area of the transparent window 11 and the arrangement of the areas 32 and 34 in the reflective area of the decorative element 2 is not limited to the arrangement shown in FIG. 1a, but both the number and the arrangement of the areas 31 to 36 can be as desired. Further, the shape of the decorative element 2 can also differ from the shape shown in FIG. 1a and FIG. 1b and can have for example the form of a patch or a security thread. Further, it is also possible for the decorative element 2 not to have a transparent area which is designed for a viewing with light passing through, and thus only to have the areas 34, 32 and 36. Conversely, it can also be the case that the decorative element 2 is designed only for viewing with light passing through and thus only has the areas 31, 33 and 35.

The decorative element 2 is formed, the embodiment example according to FIG. 1a and FIG. 1b, as a laminating film. According to further preferred embodiment examples the decorative element 2 is formed as a transfer film, in particular as a hot-stamping film, or as a security thread. Further, it is also advantageous to integrate the decorative element 2 into the layer structure of the security document 1, for example if the security document 1 is a security document in the form of a card, for example a credit card or an ID document, in particular a multi-layered polycarbonate card. In this case, the decorative element is provided by one or more layers of the security document. Further, it is also possible for the decorative element 2 not to be part of a security document and for example to be formed in the form of a transfer film, a label or an adhesive label.

Figure 1C:
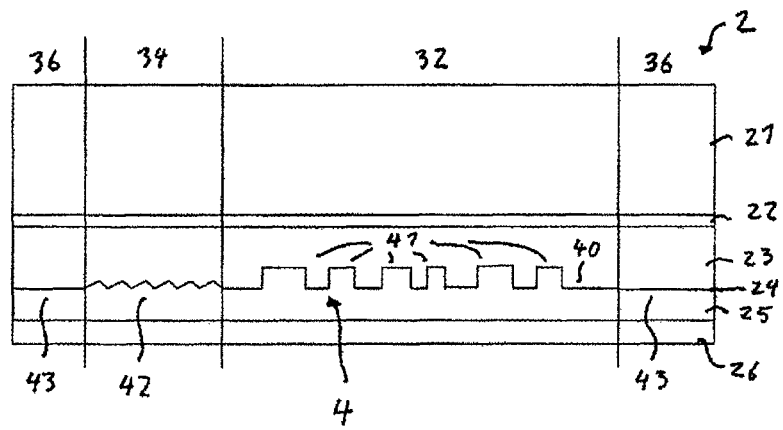

FIG. 1c now shows a sectional representation of a section of the decorative element 2, where the decorative element 2 is formed as a laminating film.

In this embodiment example, the decorative element 2 has a carrier film 21, an adhesion-promoter layer 22, a plastic layer 23, a reflective layer 24, a plastic layer 25 and an adhesive layer 26.

The carrier film 21 preferably consists of a transparent plastic film, for example a PET or BOPP film, with a layer thickness of between 20 µm and 250 µm. The surface of the carrier film can be provided with one or more functional layers, e.g. to improve the printability. The plastic layer 23 preferably consists of a transparent plastic layer which, in the range of visible light, has a transmissivity of more than 50%, preferably of more than 80%. It is also possible here for the plastic layer 23 or the carrier film 21 also to be colored with a dye. A coloring can alter the color impressions and in particular also influences the formation of the complementary color impressions.

The plastic layer 23 is preferably a lacquer layer which makes it possible to mold a relief structure into a surface of the plastic layer 23 by thermal replication or by means of UV replication. The plastic layer 23 is thus preferably a thermoplastic lacquer or a UV-curable lacquer.

The reflective layer 24 is preferably an opaque reflective layer which, in the range of light visible to the human eye, preferably has a transmissivity of less than 50%, further preferably of less than 20%. These values relate to areas without microstructure, i.e. mirror surfaces.

The reflective layer 24 is preferably a reflective layer made of metal, in particular of aluminum, silver, chromium or copper. Further, it is also possible for the reflective layer 24 to consist of a high refractive index (HRI) material, for example of ZnS or $TiO_2$. The reflective layer 24, when designed as a metal layer, preferably has a thickness in the range of from 10 nm to 100 nm and, when designed made of an HRI material, a thickness of between 40 nm and 200 nm. The reflective layer 24 can be present over the whole surface or only partially.

Further, it is also possible for the reflective layer 24 to consist of a multi-layer system. The reflective layer 24 can thus consist for example of a sequence of high and low refractive index materials or consist of a sequence of an absorption layer, a spacer layer and a reflective layer and can thus be formed for example as a Fabry-Pérot filter. Such a multi-layer system thus consists for example of a semitransparent metal layer, a dielectric spacer layer and a mirror layer, for example an 8-nm chromium layer, a 400-nm $SiO_2$ layer or polymer layer and a 50-nm aluminum layer. The reflective layer 24 can be present over the whole surface or only partially.

The plastic layer 25 preferably consists of a transparent polymeric material and optionally—as explained further below—has, at least in the area of the areas 31, a refractive index which differs from the refractive index of the plastic layer 23 by at least 0.2. If no reflective layer 24 is provided, the plastic layer 25 can fulfil the function of a reflective layer.

The plastic layers 23 and 25 preferably have a layer thickness of between 1 µm and 8 µm.

The adhesive layer 26 has a layer thickness of between 1 µm and 10 µm and serves to secure the decorative element 2 on the carrier substrate 10. The adhesive layer 26 preferably consists of a hot-melt adhesive, a cold-setting adhesive and/or of a UV-curable adhesive. It is also possible here for the adhesive layer 26 to be formed with two or more layers.

The decorative element 2 is further formed transparent in the area of the transparent window 11, with the result that all layers of the decorative element 2 provided in the area of the transparent window 11 are formed transparent. Thus, for example, the adhesive layer 26 is preferably also formed transparent and clear, at least formed transparent and clear in the area of the transparent window 11.

In addition to the layers shown in FIG. 1c, the decorative element 2 can also have further decorative layers, adhesion-promoter layers, adhesive layers and carrier layers. Further, it is also possible for the decorative element to consist only of the layer 23, and in particular also for the adhesion-promoter layer 22, the carrier film 21, the plastic layer 25 and/or the adhesive layer 26 to be dispensed with.

To produce the decorative element 2, first the adhesion-promoter layer 22 and then the plastic layer 23 are applied to the carrier film 21. Then a microstructure 4 is molded into the plastic layer 23 by means of a replication tool, for example a replication roller. The molding of the microstructure 4 here can be carried out for example using heat and pressure if a thermoplastic replication lacquer is used for the plastic layer 23 or by means of subsequent UV irradiation if a UV-curable replication lacquer is used as plastic layer 23. The reflective layer 24 is then applied, for example by vapor deposition or sputtering or printing. The reflective layer 24 is then optionally removed again in areas, for example removed again in the area of the transparent window 11. It is also possible here to provide the reflective layer 24 also only in a patterned form in the area 32, 33 and 36 and thus to introduce an additional design element in the decorative element 2. Then the plastic layer 25 and then the adhesive layer 26 are applied for example by means of a printing process.

The microstructure 4 is molded for example in the areas 35 and 36 as a mirror surface and in the areas 33 and 34 as a diffractive structure 42. In the areas 31 and 32, the microstructure 4 has a base surface 40 and several base elements 41 which has in each case an element surface raised or lowered compared with the base surface and a flank arranged between the element surface and the base surface. The element surfaces of the base elements 41 in each case run substantially parallel to the base surface 40. In one or more first zones of the areas 31 and 32, the element surfaces of the base elements 41 and the base surface are spaced apart in a perpendicular to a base plane defined by the base surface 40 by a first distance which is chosen such that a first color is generated by interference of the light reflected at the base surface 40 and the element surfaces in the areas 32 in incident light in the first or a higher diffraction order or in scattered light and/or that a first color is generated in the one or more first zones by interference of the light transferred through the element surfaces and the base surface 40 in the areas 31 with light passing through in the first or a higher diffraction order or in scattered light.

Figure 1D:
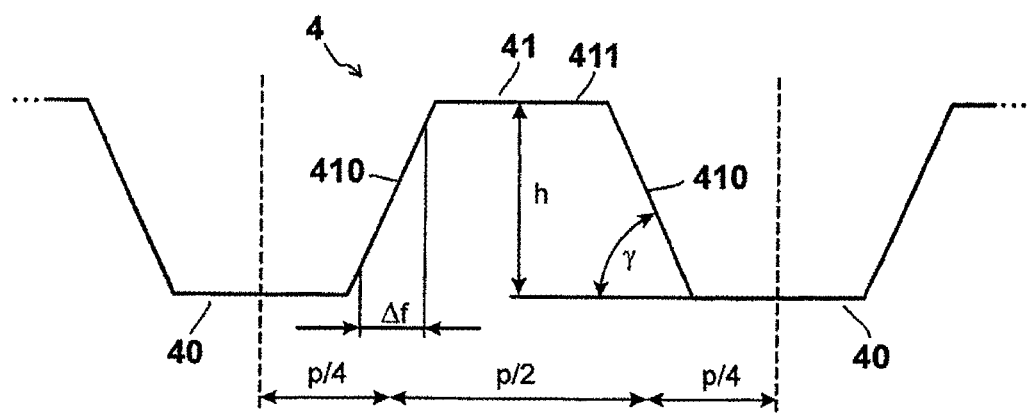
FIG. 1d shows a schematic sectional representation of a section of a microstructure.

FIG. 1d shows a section of the microstructure 4 in the area 31, 32. The microstructure 4 has the base surface 40 and the base elements 41 which have in each case an element surface 411 raised or lowered compared with the base surface 40 and a flank 410 arranged between the element surfaces 411 and the base surface 40. The element surfaces 411 of the base elements 41 run substantially parallel to the base plane. The element surface 411 neighboring the respective flank 410 and the base surface 40 neighboring this are spaced apart from each other in a direction perpendicular to the base plane by a step height h. The flank 410 of the microstructure 4 is preferably defined as a surface the height of which is at least 10% of the step height h higher than the neighboring base surface 40 and at least 10% of the step height h lower than the element surface 411 neighboring it.

In the case of a two-dimensional structure with the period p and a surface area $\Delta f$ of the flank 410 projected onto the base plane, the surface proportion of the flank projected onto the base plane is $$100\% \cdot 2 \cdot \Delta f / p$$

This surface proportion of the flanks 410 is preferably smaller than 50%, further preferably smaller than 40%, still further preferably smaller than 30% and particularly preferably smaller than 20%. It has been shown that an increase in the surface proportion of the flanks 410 leads to a reduction in efficiency and that the colors additionally become more pastel-like, thus more impure or containing more white. In order that the surface proportion of the flanks is smaller than XX %, the average flank angle $\gamma$ must meet the following condition:

$$\gamma \geq \arctan\left[\frac{h}{(100\% - 2 \cdot 10\%) \cdot XX\ \% \cdot p}\right]$$

The specific design of the microstructure 4 in the areas 31 and 32 will now be explained in the following with reference to FIG. 2a to FIG. 16.

Figure 2A:
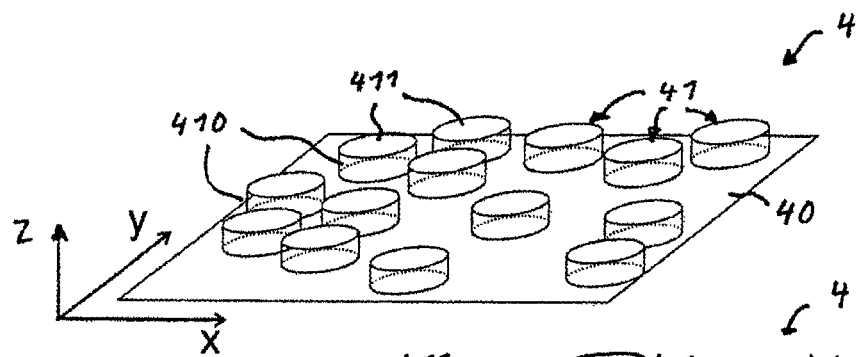
Figure 2B:
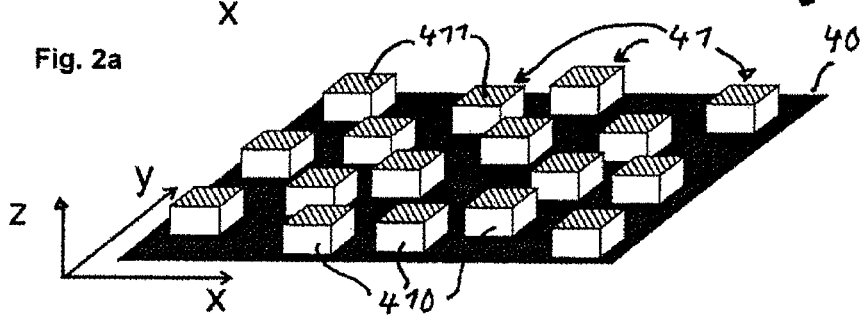
FIG. 2b in each case show a schematic, three-dimensional representation of a microstructure.

In the areas 31 and 32 or in a partial area of the areas 31 and 32, the microstructure 4 has for example the shape shown in the schematic three-dimensional representations of FIG. 2a and FIG. 2b. The microstructure 4 here has the base surface 40 which, as indicated in FIG. 2a and FIG. 2b, defines a base plane spanned by the coordinate axes x and y. The base elements 41 have element surfaces 411 which, as shown in FIG. 2a and FIG. 2b, are arranged raised compared with the base surface 40. Further, it is also possible for the microstructure 4 to be molded not in the lower surface of the plastic layer 23, but in the upper surface thereof and thus for the element surfaces 411 to be arranged not raised, but lowered compared with the base surface 40. Flanks 410 are further arranged between the element surfaces 411 and the base surface 40. In the embodiment example according to FIG. 2a and FIG. 2b, the base elements 41 thus consist in each case of an element surface 411 and a flank 410 surrounding this. The element surface 411 is spaced apart relative to a base plane defined perpendicularly by the coordinate axes x and y in the direction of a direction running a coordinate axis z by a specific distance which is chosen such that a first color is generated in incident light or with light passing through in the first or a higher diffraction order or in scattered light, as is also explained in more detail later.

In the embodiment example according to FIG. 2a the base elements 41 are molded in the form of cylinders which are arranged pseudorandomly on the base plane. Further, it is also possible for the base elements 41 to have any other shape. Thus, FIG. 2b shows for example a molding of the base elements 41 in the form of squares.

The element surfaces 411, as shown in FIG. 2a and FIG. 2b, are preferably arranged parallel to the base surface 40. However, it is also possible for the element surfaces 411 to be arranged only substantially parallel to the base surface 40 and thus for example for the element surfaces 411 to be slightly tilted relative to the base surface 40. It has proved to be advantageous here that a tilting of the element surfaces 411 compared with the base surface 40 in the range of between 5 degrees and 30 degrees, preferably in the range of from 5 degrees to 15 degrees, makes it possible to enlarge the scattering angle range and the color spectrum. By "substantially parallel" is also meant in this connection such a tilting of the element surfaces 411 compared with the base surface 410.

The surface coverage of the area or partial area with the base elements is preferably between 30% and 70%, further preferably between 40% and 60%, and further preferably, as far as possible, approximately 50% or ½. This applies to microstructures with two steps. In the case of microstructures with three steps, the surface coverage is preferably, as far as possible, approximately ⅔, in the case of microstructures with four steps, as far as possible, ¾, etc.

The flank angle of the flanks 410 is preferably larger than 70 degrees, further preferably larger than 80 degrees, and further preferably, as far as possible, approximately 90 degrees, as shown in the embodiments according to the following embodiment examples.

Figure 2C:
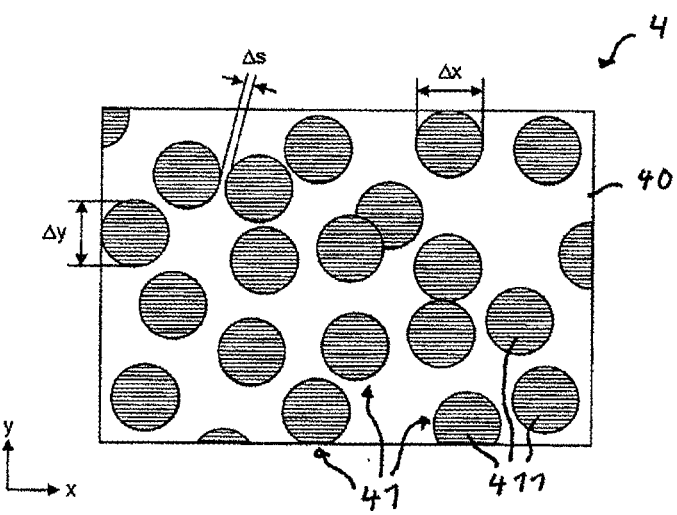
FIG. 2c shows a schematic top view of a microstructure with several base elements.

FIG. 2c now shows an embodiment in which the base elements 41 are arranged pseudorandomly in the areas 31 and 32 or in a partial area of the areas 31 and 32. The microstructure 4 is thus composed of one or more base elements, wherein the arrangement of the base elements in the x/y plane is pseudorandom. This pseudorandom arrangement suppresses or reduces undesired diffractive effects, as there are no longer any periodic structures, such as in the case of a grating. FIG. 2c now shows a top view of a section of such an area of the microstructure 4 with several base elements 41 and the base surface 40, in a direction perpendicular to the base plane, i.e. in the direction of the z coordinate axis. In the representation according to FIG. 2c, the projections of the base elements 41 onto the base plane are thus shown in a direction perpendicular to the base plane, which projections coincide here with the element surfaces 411 because of the formation of the flank angle of the flanks 410 as 90-degree angles. If the flank angle is chosen to be smaller, the surface of the projection is correspondingly enlarged.

The lateral extensions Δx and Δy of the base elements in the x/y plane lie in the range of from 0.25 μm to 50 μm, preferably between 0.4 μm and 20 μm and further preferably between 0.75 μm and 10 μm. By "lateral extension of the base elements" is meant here the lateral extension of the projection of the base elements in a direction perpendicular to the base plane. The minimum distance between neighboring base elements Δs is chosen pseudorandomly in the embodiment example according to FIG. 2c. The minimum distance between neighboring base elements Δs here preferably cannot adopt all possible values, but only values from a narrower, predefined variation range. The arrangement of the base elements 41 is thus preferably restricted such that the base elements 41 do not overlap and, at the same time, the minimum distance Δs is not larger than 300 μm, preferably is not larger than 50 μm. If overlapping base elements are permitted, they are preferably produced such that the plane at the overlap area has the same height as areas of the base elements that do not overlap. The minimum distance Δs between two neighboring base elements is preferably between 0.5 μm and 50 μm, further preferably between 0.5 μm and 20 μm.

Such a pseudorandom arrangement of the base elements 41 is preferably achieved in that a two-dimensional grid spanned by the x and y axes which defines a normal position of the respective base element 41 in the base plane is provided in the corresponding area or partial area. The base elements are now positioned in this area or in this partial area by a pseudorandom shift out of the respective normal position in the direction of the coordinate axes x and/or y, wherein the variation range of this pseudorandom shift is chosen such that the conditions set out above for the minimum spacing of two neighboring base elements 41 are preferably met.

Further, it is also possible for the minimum distance between two neighboring base elements in each case to be determined pseudorandomly and then, starting from these two base elements, for the minimum distance between the base elements neighboring these base elements again to be selected pseudorandomly, etc. and in this way for a correspondingly pseudorandom positioning of the base elements 41 to be achieved.

The pseudorandom variation, for example the pseudorandom shift of the base elements out of the normal position or the pseudorandom variation of the minimum distance between the base elements, here can take into consideration all values from the narrower, predefined variation range with the same probability. However, it is also possible for a mathematical function to be used for the probability of the consideration of a value from this variation range. Examples of such functions are the Gaussian function and an inverted Gaussian function. Further, it is also possible for the predefined variation range to comprise several predefined values from which a value is selected pseudorandomly. It is thus possible for example to select the minimum spacing Δs of two base elements 41 from a variation range which comprises for example 10 values in increments of 0.5 μm.

Figure 3A:
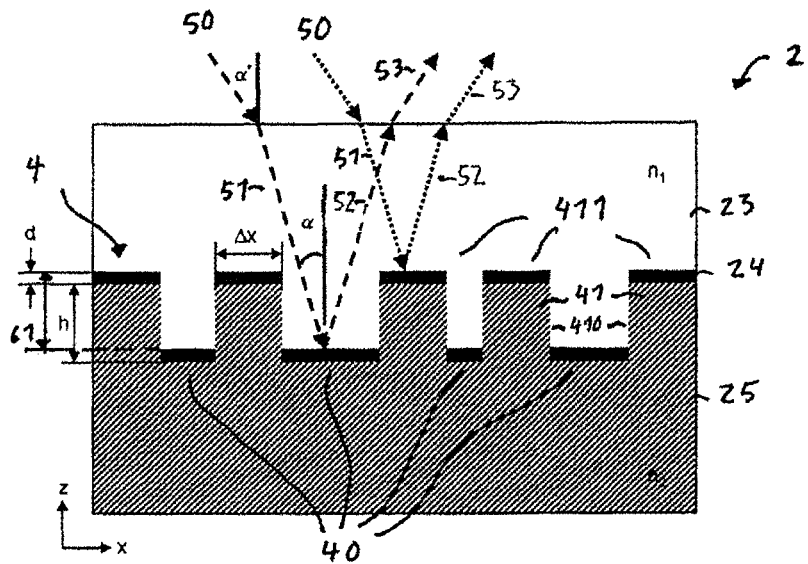
FIG. 3a shows a schematic sectional representation of a decorative element with several base elements.

FIG. 3a now shows a schematic sectional representation of the decorative element 2 in the area of the microstructure 4 according to FIG. 2c. The decorative element 2 here has the plastic layers 23 and 25 and the reflective layer 24. The plastic layer 23 has a refractive index $n_1$ and the plastic layer 25 has a refractive index $n_2$. The microstructure 4 has the base surface 40 and several base elements 41 with the element surfaces 411 and the flanks 410. The microstructure 4 is coated with the reflective layer 24, which has a thickness d, and is further embedded in the plastic layers 23 and 25. As already stated above, the flank angle of the flanks 410 is formed larger than 70 degrees, in particular larger than 80 degrees and preferably almost perpendicular (almost 90 degrees). The lower surfaces of the reflective layer 24 in the area of the element surfaces 411 and in the area of the base surface 40 are spaced apart from each other in the direction of the z axis by a height h, with the result that the first distance, i.e. the spacing 61 of the element surfaces 411 from the base surface 40, likewise has the value h.

The light 50 incident, from the air, on the decorative element 2 at an angle of incidence α* is refracted at the plastic layer 23 and thus strikes the base elements 41 and the base surface 40 of the microstructure 4 at the angle α taking into account the refraction of light. The following law of refraction applies here:

$$\sin(\alpha^*) = n_1 \times \sin(\alpha)$$

The light 50 incident on the microstructure interacts with the microstructure 4 in two ways. Firstly, the incident light 50 is reflected, because of the reflection at the reflective layer 24, into the planes determined by the element surfaces 411 and the base surface 40 and spaced apart by the distance

61 and thus the value h. The law of reflection of angle of incidence=exit angle applies here. The light reflected by these two planes interferes constructively and destructively. Constructive interference results for the wavelength λ, if:

$$\lambda = 2 \times n_1 \times h \times \cos(\alpha)$$

For the angle α of 20 degrees and $n_1=1.5$, for example a blue color impression thus results in direct reflection, i.e. in the zero diffraction order, if the height h=160 nm. A greenish color impression results for h=195 nm and a reddish color impression for h=230 nm. Depending on the distance 61 and thus the height h of the microstructure as well as the refractive index $n_1$, a different color impression thus results when the decorative element 2 is viewed in the zero diffraction order. The height h here preferably lies in the range of from 150 nm to 1000 nm, particularly preferably between 200 nm and 600 nm.

Analogously, a color is generated in the zero diffraction order by the microstructure 4 in the area 31 or in a partial area of the area 31 in the case of a viewing with light passing through in transmission by means of interference. In contrast to the formation of the decorative element 2 according to FIG. 3*a*, it is possible for the reflective layer 24 not to be provided in this area, with the result that the microstructure 4 here is embedded directly between the plastic layers 23 and 25.

The interference condition then also depends on $n_2$. Without the reflective layer 24 and disregarding the refraction of light at the boundary surface between the plastic layers 23 and 25, constructive interference between the parts of the incident light 50 transmitted through the base elements 41 and the base surface 40 results, in a first approximation, if:

$$\lambda = \frac{|n_1 - n_2| \times h}{\cos(\alpha)}$$

For an angle α of 20 degrees and $n_1=1.40$ and $n_2=1.65$, a blue color impression results in the case of a viewing with light passing through in the zero diffraction order, if the height h=1710 nm. Greenish results for h=2070 nm and reddish for h=2440 nm.

Alternatively, a transparent high refractive index reflective layer 24 is used.

In addition to the interference because of the specific choice of the distance 61, light scattering also occurs at the same time because of the lateral extension, for example the lateral extension Δx of the base elements, as described above. Because of the lateral extension of the base elements, chosen as described above, parallel to the base plane, scattered radiation occurs. Structures in the order of magnitude of the base elements 41 here scatter light to an increased extent in the forward direction. The light scattered by the irregularly arranged base elements 41 is distributed in a solid angle range around the directly reflected or directly transmitted light beams, i.e. around the zero diffraction order. The lateral extension of the base elements here determines the angle range around which light scattered around the zero diffraction order is generated by the microstructure. The larger the lateral extension of the base elements 41 is, the more striking the forward scattering is. As a result, the larger the base elements 41 are, the smaller the scattering angle β which surrounds the angle range in which the light is deflected by the microstructure by scattering out of the zero diffraction order becomes.

Figure 3B:
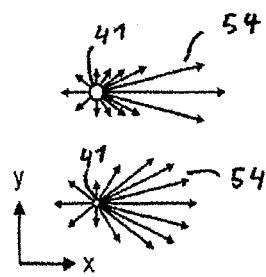
FIG. 3b shows a schematic top view of two base elements to illustrate the light scattered at the base elements.
Figure 3C:
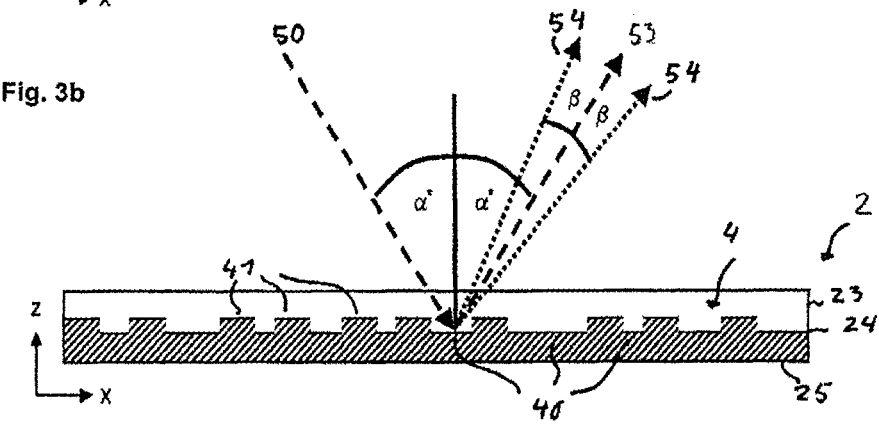
FIG. 3c shows a schematic sectional representation of a decorative element with several base elements.

FIG. 3*b* and FIG. 3*c* illustrate this effect. FIG. 3*b* shows a top view of two base elements 41, which represents forward scattering, which is striking to different extents, of two base elements 41 formed by way of example differently sized. FIG. 3*c* shows a corresponding sectional representation of the decorative element 2 with the plastic layers 23 and 25 as well as the reflective layer 24 and the microstructure 4 with the base elements 41 and the base surface 40. The light 50 incident at the angle α* here is firstly reflected by the decorative element directly in the zero diffraction order and thus generates the light 53. Scattered light 54 is further generated by the microstructure 4 in an angle range β around the light 53 reflected in the zero diffraction order.

A corresponding generation of scattered light is analogously also brought about in the case of a microstructure 4 designed for a viewing with light passing through, with the result that reference is likewise made here to the above statements.

Isotropically formed base elements 41 such as the base elements shown in FIGS. 2*a* and 2*c* generate scattered light 54 up to the scattering angle β. The scattering angle β here is given by the minimum length of the projection of the base element 41 used onto the base plane, and thus is given by the corresponding lateral dimension of the base element 41, for example is determined by the diameter of the circle, in the case of a circular disk-shaped projection of the base element onto the base plane. Preferably, β lies in the range of +/−30 degrees and further preferably of +/−15 degrees.

If the incident light 50 is white light and all materials of the layers 23, 24 and 25 are transparent in a color neutral manner or reflective in a color neutral manner, the scattered light 54 usually has the complementary color impression compared with the light beam 53, which is to be observed in the zero diffraction order. Because of the conservation of energy, in this case the incident white light must be divided into the directly reflecting light 53 and the scattered light 54, which leads to the complementary color impression. The incident light 50 which does not enter into direct reflection or transmission constructively and is not absorbed is to be found for the most part in scattered light. If the scattered light thus appears greenish for example, the light reflected directly in the zero diffraction order appears violet. The complementary color impression forms above all when the reflective layer 24 consists of a material that reflects in a color neutral manner, such as e.g. aluminum or silver. Aluminum thus reflects light for example over the whole visible spectral range with approx. 90% efficiency and is thus suitable for producing complementary color impressions. Copper, on the other hand, has a stronger absorption in the short-wave, i.e. blue, spectral range and accordingly alters the color impressions because copper does not reflect in a color neutral manner.

Figure 4:
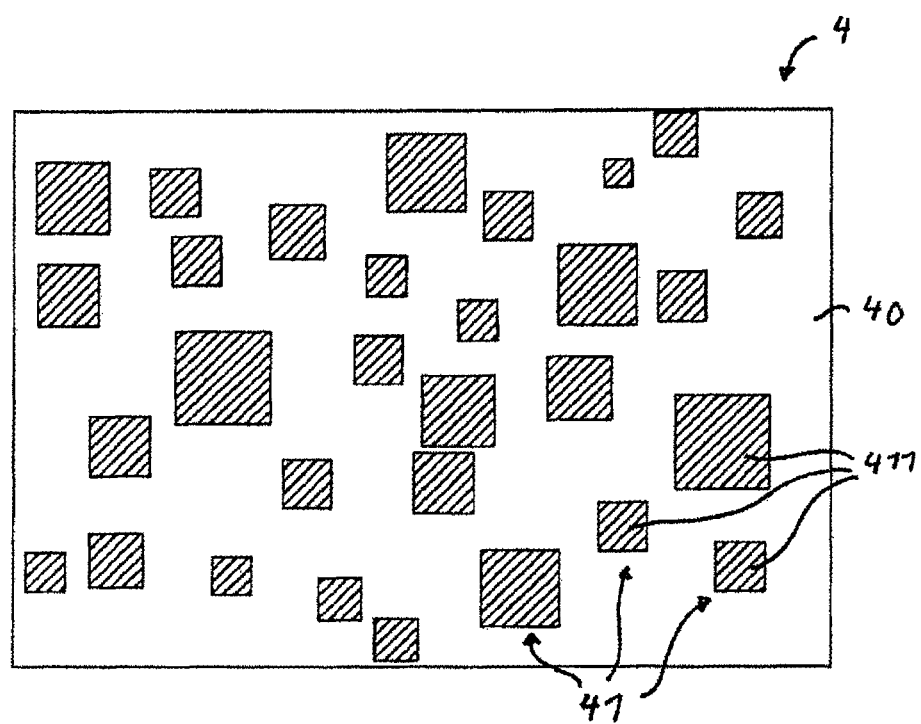
FIG. 4 shows a schematic top view of a microstructure with several base elements.
Figure 7:
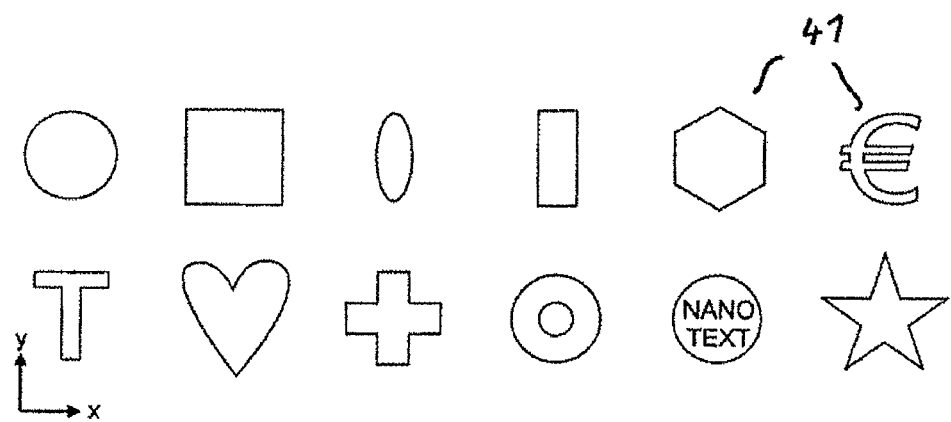
FIG. 7 shows a schematic top view of several base elements.

In addition to the pseudorandom positioning of the base elements 41, the size of the base elements can additionally also be varied pseudorandomly. FIG. 4 thus shows for example a top view of the microstructure 4 with the base surface 40, the base elements 41 and the element surfaces 411. The element surfaces 411 of the base elements 41 here have a square shape, wherein the size of the squares is varied from base element 41 to base element 41 in a predefined variation range. To vary the size of the surface area of the projection of the base elements 41 onto the base plane, the dimension of the projection of the respective base element onto the base plane in the direction of the x axis and/or y axis is preferably varied pseudorandomly within a predefined variation range. Thus, for example, the lateral dimension Δx of the element surfaces or the projection of the base element in the x direction or the lateral dimension of the element surfaces or the projection of the base element in the y direction is varied pseudorandomly in a variation range of for example from 1 μm to 10 μm.

In addition to the positioning of the base elements, spacing of the base elements from the closest neighboring base element, the size of the surface area of the projection of the base element onto the base plane, it is further also possible to vary the shape of the projection of the base element onto the base plane or onto the lateral preferred direction of the projection of the base element onto the base planes pseudorandomly within a predefined variation range. Further, it is also possible for only one of the previously stated parameters to be varied pseudorandomly within a predefined variation range.

In the above statements, base elements 41 were described which form symmetrical base elements in the sense that their projection onto the base plane in a direction perpendicular to the base plane has a symmetrical surface shape. However, it is particularly advantageous to use asymmetrical base elements in which the projection of the respective base element onto the base planes has an asymmetrical shape with a lateral dimension in a preferred direction lying in the base plane which is larger than the lateral dimension of the projection transverse to the preferred direction, preferably 50% larger, preferably is more than 80% larger, further preferably more than 2 times and in particular more than 5 times larger than the dimension transverse to the preferred direction. Complex optical effects can be achieved with such asymmetrical base elements.

FIG. 5a thus shows an area 312 of the decorative element 2 in which the microstructure 4 comprises a plurality of base elements 41 which have an asymmetrical shape. The projection of the base elements 41 onto the base plane or the element surfaces thus have an elongate, for example elliptically formed, shape the longitudinal axis of which, as shown in FIG. 5a, defines a preferred direction 418. The base elements 41 in the area 312 are molded identically, with the result that the preferred directions 418 of the base elements 41 in the area 312 are aligned parallel to each other. The base elements 41 are further positioned pseudorandomly on the base surface 40, as already stated above.

The scattering angle $\beta_{x-z}$, in the case of illumination and viewing in the x/z plane and the scattering angle $\beta_{y-z}$ in the case of illumination and viewing in the y/z plane here differ in the area 312, as represented in FIGS. 6a and 6b. FIG. 6a thus shows a representation of the microstructure 4 with the base elements 41 and the base surface 40 in the area 312 in the case of illumination and viewing in the x/z plane and FIG. 6b in the case of illumination and viewing in the y/z plane. As the scattering angle range .beta., as set out above, is dependent on the lateral dimension of the base elements in the viewing/illumination direction, the scattering angles $\beta_{x-z}$ differ, as represented in FIG. 6a and FIG. 6b. This has the result that the color impression of the scattered light changes when the security element is rotated in the x/y plane, i.e. when rotated around the z axis while maintaining the viewing angle. For example, the scattered light can appear cyan-colored or light blue or turquoise in the case of a viewing in the x/z plane and can change to dark blue/green or dark gray in the case of a rotation in the y/z plane. The effect here appears in the manner of a color appearing anisotropic/matt.

FIG. 5b shows the formation of the microstructure 4 in an area 313 of the decorative element 2. The microstructure 4 here has a plurality of base elements 41 and the base surface 40. The base elements 41 are likewise molded as asymmetrical base elements. However, not only are the base elements 41 positioned pseudorandomly in the base plane here, but their preferred direction 418 is furthermore also likewise varied pseudorandomly within a predefined variation range from base element to base element. No change of the scattered light occurs here when the decorative element is rotated. However, the scattering angle range is larger compared with symmetrical base elements. The pseudorandom variation of the preferred direction of the base elements 41 can comprise the whole angle range of from minus 180 degrees to plus 180 degrees. The angle range can, however, also be restricted and here can be, as already stated above, preferably between minus 90 degrees and plus 90 degrees, further preferably minus 30 degrees and plus 30 degrees.

FIG. 5c shows a further embodiment example of the formation of the microstructure 4 in the areas 31 and 32 of the decorative element 2.

In this embodiment example, the area 31 or the area 32 has one or more first cells 314 in which the base elements 41 are formed as asymmetrical base elements with a first preferred direction and one or more second cells 315 in which the base elements are formed as asymmetrical base elements with a second preferred direction. In the first cells 314, the base elements thus have an identical preferred direction 418. Likewise, the base elements in the one or more second cells 315 have identical preferred directions 415. As shown in FIG. 5c, the preferred direction of the base elements 41 is chosen to be different in the one or more first cells 314 and in the one or more second cells 315. However, in the first and second cells, when the decorative element 2 is rotated around a direction perpendicular to the base plane, an optical effect such as described above is generated in a corresponding angular offset relative to each other, with the result that the first and second cells generate different optical effects. Further, it is also possible to provide, in the area 31 or 33, not only first and second cells, but also one or more third cells, in which the base elements are formed as symmetrical base elements. FIG. 5d shows an embodiment example of such a design of an area of the microstructure 4 of the decorative element 2 with a first cell 314 and a third cell 316, in which the base elements 41 are formed as symmetrical base elements.

Further, it is also possible to provide further cells which are formed like the first and second cells and in which the preferred direction of the base elements differs from the preferred direction of the first and second cells, and to combine these cells as desired with the first and second cells. The size of the cells is preferably more than 300 μm, further preferably more than 500 μm, further preferably more than 1 mm and in particular more than 5 mm. In an embodiment with cells having dimensions in the macroscopic range, movement effects are produced in the case of rotation, e.g. "rolling bar" effects are produced. To produce a "rolling bar" effect, it is possible for example to place several elongate cells with the asymmetrical base elements next to each other, wherein the preferred direction of the base elements varies continuously from cell to cell, for example increases in steps of 10 degrees. The size of the elongate cells is, for example, 20 mm in the longitudinal direction and 500 μm in the transverse direction. If 19 such cells are arranged next to each other, wherein the preferred direction of the first cell is 0 degrees and the preferred direction of the other cells increases in steps of 10 degrees, then the preferred direction of the middle cell is 90 degrees and that of the last cell is 180 degrees (or 0 degrees again). If a decorative element of such an embodiment is now viewed at a suitable fixed tilt angle and then rotated, the brightness of the color impression varies like a band of light over the decorative element.

According to an alternative embodiment example of the invention, the size of the first, second and third cells 314 to 316 is chosen to be below the resolution limit of the human eye, preferably chosen to be smaller than 300 μm and further preferably smaller than 100 μm. In such a molding of the cells 314 to 316, a mixing of the effects of the individual cells 314 to 316 results as a color impression of the scattered light. In this design, the decorative element contains a concealed security element. In the case of a viewing under a microscope, the brightness of the different cells differs if the resolution is chosen to be high enough.

Further, it is also possible to design the shapes of the base elements differently from in the previous embodiment examples according to FIG. 2a to FIG. 6b. The projection of the base elements onto the base plane can thus have for example the shapes shown by way of example in FIG. 7, and can thus have for example the shape of a circular disk, a square, an ellipse, a rectangle, a hexagon, a currency symbol, denomination sign, a letter, the shape of a symbol, for example a heart shape, a cross, a ring, a circle with nanotext or a star. The base elements or their projection onto the base planes can further also be formed by letters and symbols which form a microtext on the basis of the arrangement of the base elements on the base plane. The base elements which form the microtext preferably have a pseudorandom variation of the positioning of the base elements in the first area or in at least one first partial area of the first area, wherein the microtext is readable despite the variation. The shape of the base elements or the shape of the projection of the base elements onto the base plane can in this way also provide a concealed security feature in the decorative element 2. By analysis of the decorative element for example by means of optical microscope technology, the shape of the base elements or the shape of the projection of the base elements onto the base plane can be detected and thus the concealed security feature can be checked. Further, the arrangement of a shape of the base elements can also carry a concealed item of information. If for example the microstructure is 95% formed of base elements with one shape—e.g. circles—and 5% formed of base elements with another shape—e.g. crosses—then the arrangement of the crosses can be the concealed item of information.

According to a further embodiment it is also possible for the base elements 41 to have not only one element surface, but also to have several element surfaces which influence the interference of the incident light and thus the generation of the color. Such an embodiment is described in the following by way of example with reference to FIG. 8a and FIG. 8b.

Figure 8A:
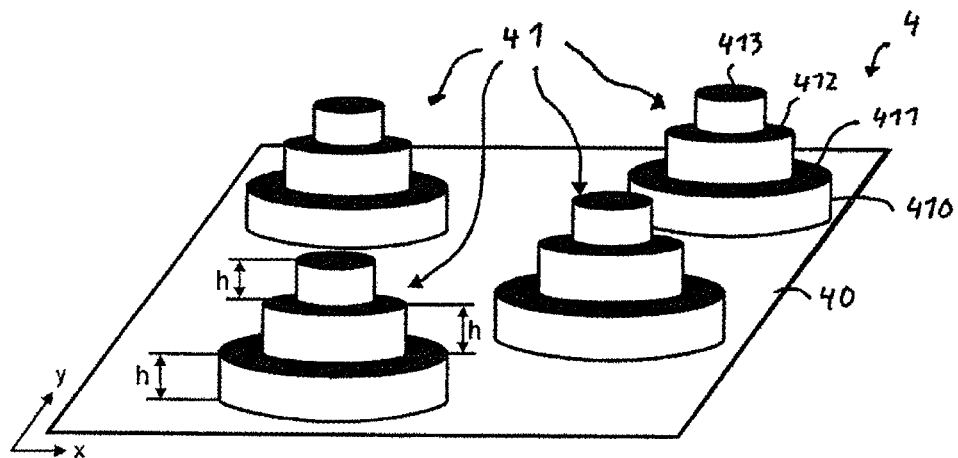
FIG. 8a shows a schematic three-dimensional representation of a microstructure with several base elements.

FIG. 8a shows a three-dimensional representation of the section of the microstructure 4 in one of the areas 31 and 32. The microstructure 4 here has the base surface 40 as well as a plurality of base elements 41, of which four are shown in FIG. 8a. The base elements 41 have in each case not only the element surface 411, but still further element surfaces 412 and 413. These element surfaces 412 and 413 are likewise arranged in each case substantially parallel to the base surface 40 and further are spaced apart from the base surface in the direction of the z axis when the base elements 41 are arranged in one of the first zones by a multiple of the first distance, i.e. the distance 61. The element surfaces 412 and 413 are thus spaced apart from each other as well as from the element surface 411 likewise by the distance h, with the result that the interference condition, as has been explained previously with reference to FIG. 3a, is likewise met for the element surfaces 412 and 413. The surface area of the element surfaces 411, 412 and 413 is preferably, as far as possible, the same size. In other words, the surface proportion of each step including the base surface is approximately the same size, e.g. is approximately ¼ in the case of base elements with four steps.

Figure 8B:
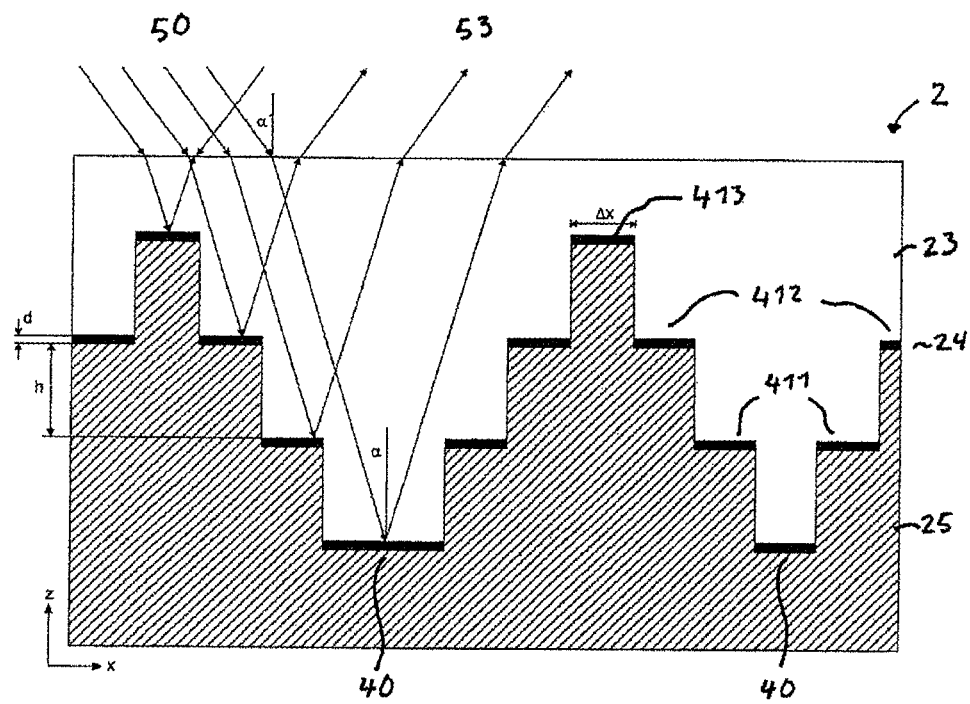

FIG. 8b shows a corresponding sectional representation of a section of the decorative element 2 with the plastic layers 23 and the reflective layer 24. The light 50 incident at the angle α here is reflected in the zero diffraction order as light 53, wherein the light beams reflected at the base surface 40, at the element surfaces 411, at the element surfaces 412 and at the element surfaces 413 are superimposed and a color is generated by the microstructure 4 by constructive or destructive interference. The base elements 41 here can be designed not only with three steps, but also with two or several steps and thus, in addition to the element surface 411, can have one or more further element surfaces which are preferably arranged as explained previously.

The color purity in the case of a viewing in the zero diffraction order is significantly increased by the introduction of these further planes. It is preferred here that the surface proportions of the different element surfaces in the projection of the base element 41 onto the base plane are the same, whereby the purest colors also result. The height h at which the further element surfaces 412 and 413 are spaced apart is preferably the same. The height h preferably lies in the range of from 150 nm to 1000 nm and particularly preferably in the range of from 200 nm to 600 nm. The quality of having several steps has the advantage of a better-directed constructive interference and thus a stronger color impression. The larger the number of element surfaces spaced apart from each other is, the narrower the spectrum of the constructively reflected light becomes. The number of element surfaces of the base elements spaced apart from each other is preferably chosen to be in the range of from 2 to 6.

With respect to the molding of the projection of the base elements onto the base plane as well as the positioning of the base elements in the base plane, the above statements in respect of the base elements 41 apply correspondingly. The projection of the base elements 41 can thus have the shape shown in FIG. 7, FIG. 5a to FIG. 5d, FIG. 4 and FIG. 2a to FIG. 2c. Here, the further element surfaces and the element surface 411 are preferably further molded such that they result in a concentric, pyramid-shaped structure and thus the element surfaces 411 and 412 have a ribbon-like shape following the outer contour. The surface proportion of the element surfaces is preferably the same size.

According to a further preferred embodiment the microstructure in the areas 31 and 32 or in one or more partial areas of the areas 31 and 32 has a periodic arrangement of base elements 41, the projection of which onto the base plane preferably has an identical shape. The projection of the base elements onto the base plane preferably has the shape of bars or dots. Further, the base elements preferably follow on from each other periodically isotropically or pseudo-isotropically in the direction of an azimuth angle which thus describes the spatial direction of the sequence in the x/y plane. The distance of the element surfaces of the base elements from the base surface here is preferably constant.

Figure 9A:
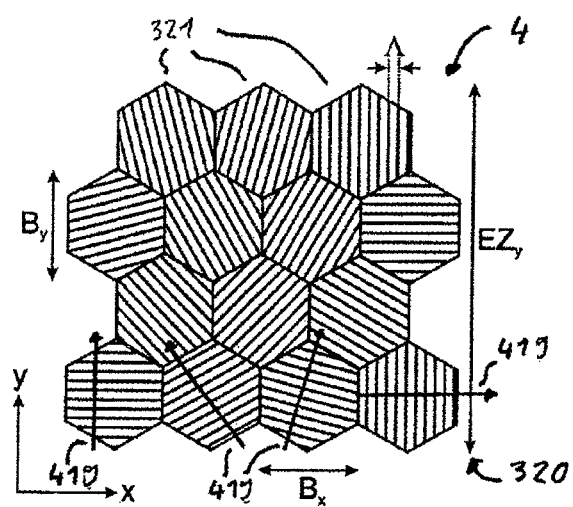
FIG. 9a shows a schematic top view of a cell of a decorative element which is divided into several partial areas which are covered in each case with base elements.
Figure 9B:
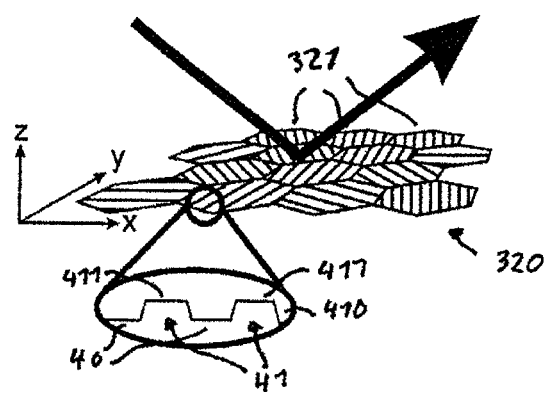

FIG. 9a and FIG. 9b now illustrate, by way of example, such an embodiment. FIG. 9a shows a top view of a partial area of the microstructure 4 forming a cell 320. The cell 320 comprises several partial areas 321 in which the base elements 41 in each case follow on from each other periodically. This is explained by way of example in FIG. 9b. Thus, in the areas 321, the microstructure 4 has the base surface 40 and the base elements 41 with the element surfaces 411 and the flanks 410. The base elements 41 here are formed in the shape of bars, the cross-section of which is shown in the lower representation of FIG. 9b and the extension of which in the x/y plane is indicated by a corresponding line in FIG. 9a and FIG. 9b. The cross-section of the base element 41 of the respective partial area 321 here is identical and the projection of the base elements 41 onto the base plane follows on from each other periodically, as indicated in FIG. 9a and FIG. 9b, in the direction of a respective azimuth angle 419. The microstructure 4 is thus determined, in the partial areas 321, in each case by the parameters azimuth angle 419, by the base element shape, for example the bar shape according to the lower representation according to FIG. 9b, and by the spatial frequency and thus the period in which the base elements 41 follow on from each other in the direction of the azimuth angle 419.

One or more of the parameters azimuth angle, base element shape and/or spatial frequency of the partial areas 321 arranged in the cell 320 are now preferably varied pseudorandomly from partial area 321 to partial area 321 within a variation range predefined for the cell 320.

The cell 320 shown in FIG. 9a thus has for example partial areas 321 in which the azimuth angle 419, and thus the orientation of the base elements 41 in the different partial areas 321, is varied pseudorandomly. Thus, for example, the azimuth angle varies pseudorandomly and thus isotropically between 0 and 180 degrees in steps of 15 degrees. The distance between the element surfaces of the base elements 41 in the partial areas 321 here is preferably constant, but can also likewise be varied pseudorandomly.

The pseudorandom alignment of the azimuth angle 419 can comprise the whole angle range of from minus 180 degrees to plus 180 degrees. However, is it also advantageous to restrict the angle range and thus the variation range of the pseudorandom variation. Thus, it is further preferred to vary the azimuth angle 419 between minus 90 degrees and plus 90 degrees, further preferably between minus 30 degrees and plus 30 degrees.

Further, it is also advantageous to form the microstructure 4 in the areas 31 and 32 or in partial areas of the areas 31 and 32 in the form of a circular grid, in which the base elements 41 preferably have a circular ring shape.

In general, it is true for the previously explained microstructures that the period in which the base elements 41 follow on from each other periodically preferably lies in the range of from 0.75 µm to 10 µm. The size of the partial areas 321 preferably lies in the range of from 5 µm to 100 µm and further preferably between 10 µm and 30 µm. The size of the cells 320 is preferably chosen to be between 40 µm and 300 µm, further preferably between 80 µm and 200 µm. Here too, the base element according to the embodiments according to FIG. 8a and FIG. 8b can be formed with several steps with several element surfaces. The several steps can be symmetrical—i.e. like a staircase going up and then back down—or asymmetrical—i.e. like a staircase that only goes up or only goes down. The distance of the element surfaces 411 from the base surface 40 preferably lies in the range of from 150 nm to 2000 nm, further preferably in the range of from 200 nm to 1000 nm and further preferably in the range of from 200 nm to 500 nm.

In contrast to the embodiments explained with reference to FIG. 2a to FIG. 8b, in the case of the decorative element according to FIG. 9a and FIG. 9b the complementary color impression occurs, not in scattered light, but in diffraction in the first and sometimes higher order. The diffraction does not appear as a rainbow color effect, or at least appears only markedly weakened. Because of the holding of energy, a large part of the light which is not constructively deflected in the zero diffraction order goes into the first or higher diffraction order, with the result that the color impression in the case of at least one viewing outside the zero diffraction order is largely determined by the complementary color impression of the color in the case of a viewing in the zero diffraction order. The period and molding of the base elements 41 here is preferably to be chosen such that a large part of the light deflected out of the zero diffraction order is deflected in an angle range β of +/−30 degrees around the zero diffraction order, in order to achieve the advantageous optical effect as explained previously.

Figure 10A:
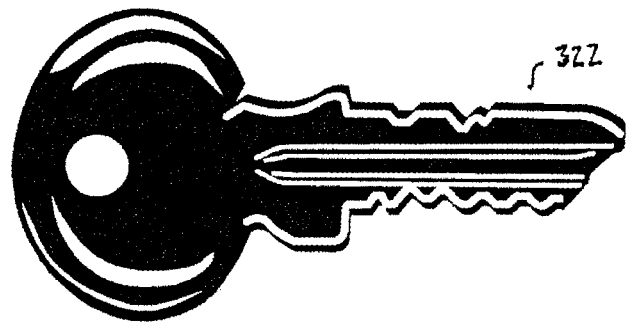
FIG. 10a shows a photograph of a top view of an area of the decorative element.
Figure 10B:
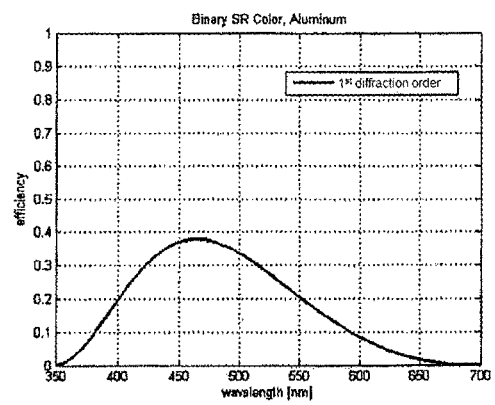
FIG. 10b shows a spectrum of a first color impression of the decorative element according to FIG. 10a and the associated chromaticity diagram.
Figure 10B:
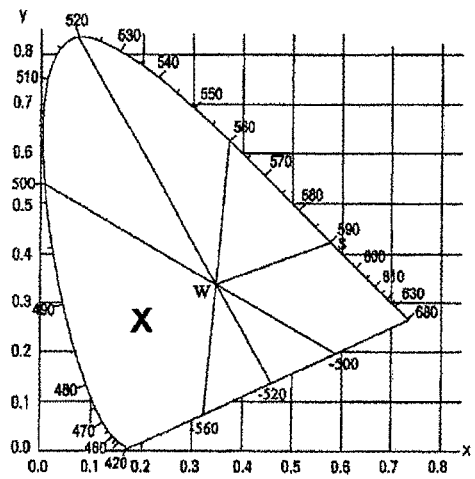

According to a further preferred embodiment of the invention, in the areas 31 or 32 or in a partial area of the areas 31 and 32, the base elements 41 of the microstructure 4 are positioned following a non-periodic function. FIG. 10 shows by way of example a top view of an area 322 of the decorative element 2 which generates the item of optical information shown in FIG. 10a by means of such an arrangement of the base elements. FIG. 10b shows an allocated spectrum of a first color impression as well as the associated chromaticity diagram. The structure depth is h=350 nm and the structure borders the air, i.e. n=1.0. The base elements here are arranged with a distance 61 between the element surfaces 411 and the base surface 40 of 330 nm and the arrangement of the base elements on the base plane as well as the molding of the projection of the base elements onto the base plane are formed as explained below with reference to FIG. 11a to FIG. 11d. For the observer, the shape of a three-dimensional object, for example the key shown in the representation according to FIG. 10a, is thus visible for example in the area 322. In the areas of the three-dimensional object which visualize a strong curvature, the representation of the three-dimensional object appears bluish. In the other areas, the three-dimensional object appears yellow in color. When the decorative element is tilted, the surfaces appearing blue and yellow change correspondingly, with the result that a three-dimensional impression of the three-dimensional object is visualized by the decorative element.

Figure 11A:
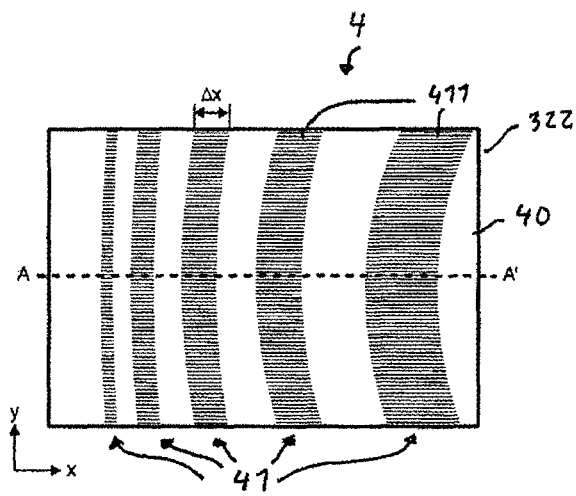
FIG. 11a shows a schematic top view of a section of a microstructure with several base elements.
Figure 11B:
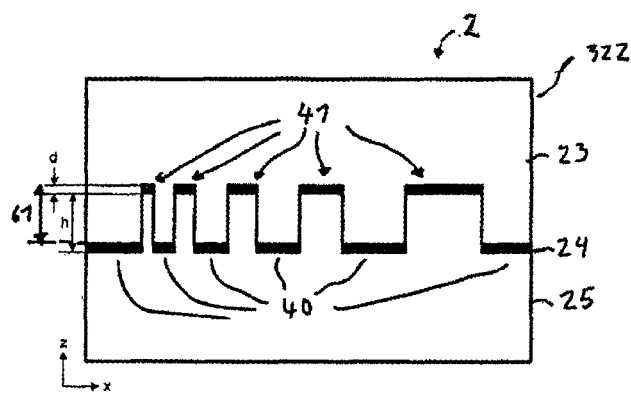

FIG. 11a now shows a top view of a section of the area 322, in the case of a viewing perpendicular to the plane spanned by the base plane. FIG. 11b shows a corresponding sectional representation of the decorative element 2 in a partial area of the area 322 along the line A-A' from FIG. 11a.

In the partial area 322, the decorative element 2 thus has the plastic layers 23 and 25 and the reflective layer 24. Further, the microstructure 4 is provided which has, in the partial area 322, the base surface 40 as well as the base elements 41, the element surfaces 411 of which are spaced apart from the base surface 40 by the distance 61 in the direction of the z axis. The base elements 41 here—as shown in FIG. 11a and FIG. 11b—are generally not arranged in a periodic sequence and further also differ by the molding and size of the projections onto the base plane. The arrangement of the base elements 41 and the surface dimension of the projections of the respective base elements 41 in the area 322 here are determined by a function which describes a binary diffraction structure which deflects the incident light according to a predefined three-dimensional free-form surface with one or more free-form elements. Such a free-form element can be formed for example by a section of a surface of a three-dimensional object, as is the case for example the representation according to FIG. 10. Here, the free-form element is formed by a section of the surface of a three-dimensional object, namely a key. Further, it is also possible for free-form elements to be free-form elements producing magnification, demagnification and/or distortion effects in the form of an alphanumerical character, a geometric figure or another object.

The binary diffraction structure here can be produced for example by means of a lithographic mask process or by means of a lithographic direct-write process (e.g. e-beam or laser writer). It is thus possible for example to detect the three-dimensional surface of the free-form element optically and to vary the spacing of the base elements and the size of the surface area of the projection of the base elements as a function of the respective curvature of the three-dimensional object, in order thus to produce for example a representation according to FIG. 10: The projections of the base elements or the element surfaces of the base elements are thus chosen as a function of the local curve of the three-dimensional object, wherein in the area of a strong curve the spacing of the base elements and the surface dimension of the projections or of the element surfaces transverse to the progression of the curve are made smaller. An arrangement of the projections or element surfaces that runs substantially concentrically thus results parallel to the areas of strong curve of the three-dimensional object, wherein the spacing of the base elements and the surface extensions of the projections of the base elements transverse to the areas of the curves vary and have minima in the area of the largest curves.

FIG. 11a and FIG. 11b show by way of example a section from such an arrangement of the base elements. The base elements 41 mainly contributing to the color impression in the area of the curves of the free-form surfaces have a lateral extension in the x/y plane in at least one direction in the range of from 0.25 μm to 500 μm, preferably between 4 μm and 100 μm. The width of the base elements 41 in the section shown in FIG. 11a and the spacing of the base elements thus amount to dimensions from the above-named range along the section line A-A'. The variation of the width of the base elements 41 and the interspaces between the base elements 41 here follows a function f (x, y), which reflects the shape of the free-form surface and—as set out above—the change in the rise of the free-form surface in relation to the z axis. The distance 61 of the element surfaces 41 from the base surface 40 is chosen as set out above. Surprisingly, it has been shown, with reference to prototypes produced in practice, that the optical effect of a three-dimensional free-form surface is only insignificantly altered by choosing the structure depth 61 to be much larger according to the previously discussed principles and an additional item of color information is produced. Through the corresponding choice of the distance 61 as set out above, the first or higher diffraction order obtains a color modulation which appears as a clear non-rainbow color, combined with the effect of a three-dimensional free-form surface that remains unchanged. The first diffraction order usually has a complementary color impression compared with the directly reflected light beam. The incident light which is neither reflected constructively in the zero diffraction order nor scattered is largely found in the first diffraction order again. Giving the effect of a three-dimensional free-form surface a defined color results not only in a simple coloring, but in a visually very attractive interplay of color effects with three-dimensional effects of a three-dimensional free-form surface, similar to the naturally occurring color effects that appear structural, sometimes metallic on butterfly wings (e.g. Blue Morpho Didius). This interplay of color effects and effects of the three-dimensional free-form surface is very important for the visual perception. Thus, the key represented in the area 322 in the representation according to FIG. 10a is determined in terms of its perceptibility substantially by the proportions of the reflected light diffracted in the first order and changed in color, which light appears bluish, and the light reflected in zero order, which appears yellowish, instead recedes in terms of perception.

Figure 11C:
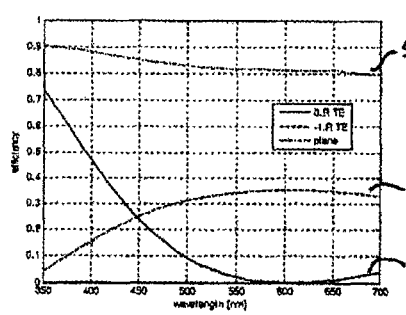
FIG. 11c.
Figure 11D:
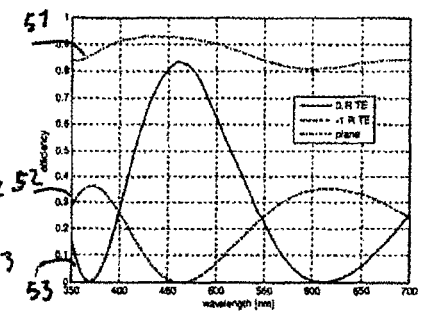
FIG. 11d in each case show diagrams which illustrate the wavelength-dependent diffraction efficiency of a microstructure.

FIG. 11c and FIG. 11d thus illustrate the different effect of the microstructure 4 in the case of a corresponding change in the distance between element surfaces 411 and base surface 40 corresponding to the distance 61 (h=300 nm) in FIG. 11d and if the distance is chosen to be smaller (h=100 nm) in FIG. 11c. A microstructure according to FIG. 11c shows no striking dependence of the diffraction efficiency on the wavelength in the visible spectral range, and thus shows a known rainbow color effect when viewed with the human eye. Such a microstructure shows practically no striking color effect within the meaning of the invention which occurs first in the case of a clearly striking dependence of the diffraction efficiency on the wavelength, as represented e.g. in FIG. 11d.

A further variant of an arrangement of the base elements 41 according to a non-periodic function is described in the following with reference to FIG. 12.

Here, a hologram of one or more virtual 2D and/or 3D objects is calculated, and ideally both the amplitude and the phase of the hologram are calculated here, and the hologram is binarized. A binary computer-generated hologram (CGH), for example a kinoform, is thus used for example as the function.

Figure 12A:
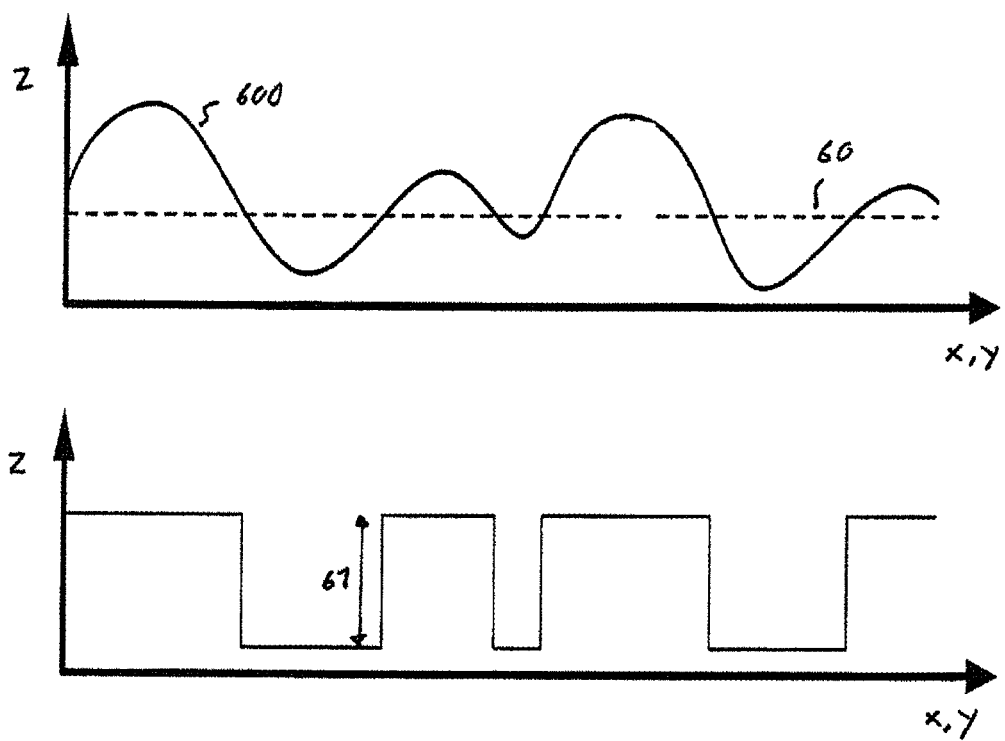
FIG. 12a shows diagrams to illustrate the binarization of a function.

FIG. 12a shows the binarization with reference to a possible phase response 600 of a computer-generated hologram. A schematic representation of a section with a height in the z direction as a function of the position in the x/y direction is shown. In the binarization, the phase value above a boundary value 60 which is indicated by a dashed line is set to a maximum value of the height, and below this it is set to a minimum value of the height. As shown in the lower representation of FIG. 12a, a binary function thus results. The difference between the maximum value of the height and the minimum value of the height is now chosen corresponding to the distance 61 as determined previously and thus determines the color impression of the corresponding area of the decorative element 2. The laser wavelength that is optimum for the reconstruction of the hologram is twice the step height times the refractive index of the surrounding medium, wherein here the distance 61 is chosen as the step height. In this embodiment of the invention the surface coverage is determined by the item of hologram information and the binarization algorithm.

Figure 12B:
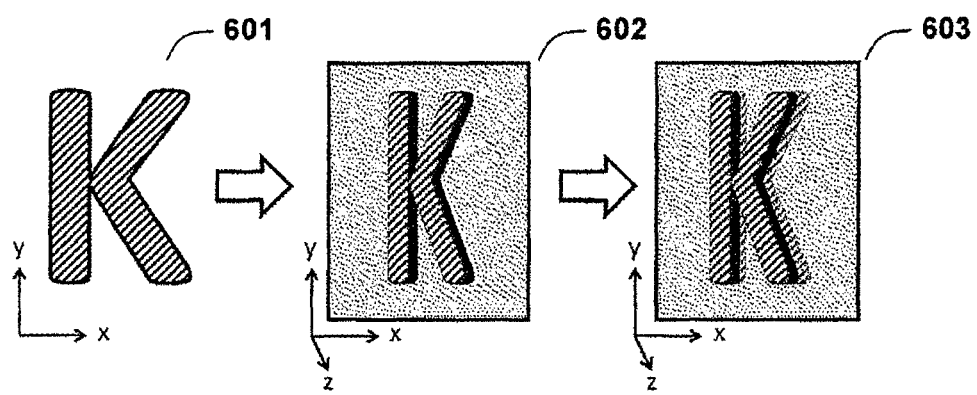
FIG. 12b shows schematic top views of representations.
Figure 12C:
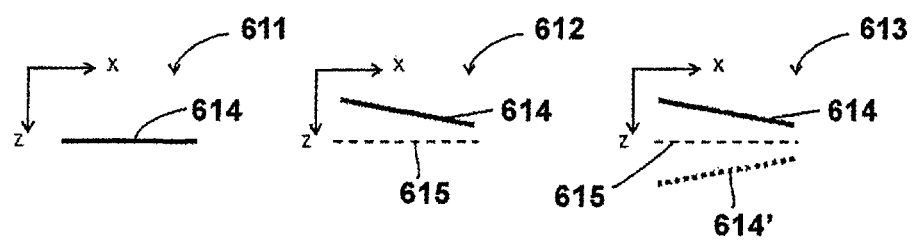
FIG. 12c shows schematic top views of sections of the representations according to FIG. 12b.
Figure 12D:
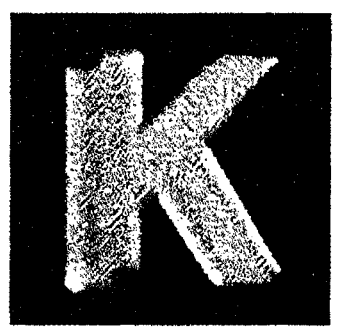
FIG. 12d shows a photo of a binary hologram.

An example of a computer-generated binary hologram is shown schematically in FIGS. 12b and 12c.

The template 601 which is used to calculate the hologram is shown on the left in FIG. 12b. In this case, it is the letter "K". In the middle, the target image 602 desired on the basis of this template 601 is shown, which is calculated as a hologram. The K here floats behind the hologram plane, wherein the right-hand edge of the K is closer to the hologram plane than the left-hand edge is. This is indicated by the cast shadow. Then the reconstruction 603 of the binarization of the calculated computer-generated hologram is shown on the right.

FIG. 12c shows schematically the respective section 611, 612 and 613, i.e. a section in the x/z plane. On the left, i.e. in the case of the section 611, the K 614 lies in the hologram plane. In the middle, i.e. in the case of the section 612, the K 614 is represented behind the hologram plane 615. On the right in FIG. 12c, the section 613 of the reconstruction of the hologram is represented by the binary computer-generated hologram. As the hologram is binary, not only the target image, that is the K 614 behind the hologram plane 615, but also the mirror image 614', which appears to float in front of the hologram plane 615, forms.

The reconstruction with depth and the superimposition of the two images lead, in addition to the color effect in the form of the "K", additionally also to a movement effect when tilted. As a rule, however, the reconstructed K for which the hologram was calculated, here the K lying behind, dominates in the reconstruction, see also FIG. 12*d*, which shows a photo of such a binary hologram.

Further, it is also possible, in the previously described design of the microstructure according to FIG. 11*a* to FIG. 12*a-c*, to use not only base elements with one element surface, but also a base element with two or more element surfaces according to the embodiment example according to FIG. 8*a* and FIG. 8*b*, with the result that the statements in this respect also apply analogously here.

According to a further embodiment the base elements 41 of the microstructures in the areas 31 and 32 do not have a uniform spacing of the element surfaces from the base surface. In addition to one or more first zones, in which the distance of the element surfaces of the base elements 41 from the base surface 40 corresponds to the distance 61 or a multiple of the distance 61 (see embodiment according to FIGS. 8*a*, 8*b*), the microstructure also has, in the areas 31, one or more second and/or third zones, in which the element surfaces are spaced apart from the base surface 40 in the direction of the coordinate axis z by a second or third distance respectively or a multiple of a second or third distance respectively, which is different from the first distance. The second and third distance here is chosen such that a third or fourth color respectively, which differs from the first color, is generated in the one or more second or third zones by interference of the light reflected at the base surface 40 and the element surfaces 411 in incident light in the first diffraction order or in scattered light and/or by interference of the light transmitted through the element surfaces 411 and the base surfaces 40 with light passing through in the first or higher diffraction order or in scattered light.

Figure 13A:
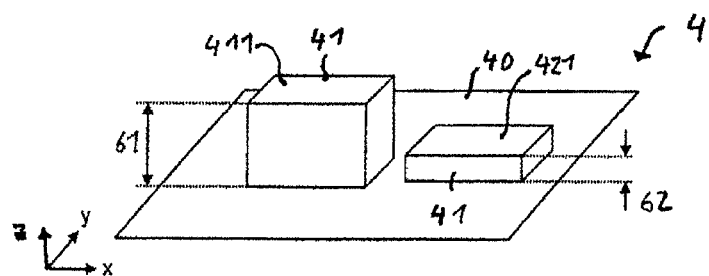
FIG. 13a shows a schematic three-dimensional representation of a section of a microstructure with two base elements of different height.

FIG. 13*a* now shows an area of the microstructure 4 in which two base elements 41 are provided on the base surface 40. The element surface 411 of one base element 41 is spaced apart from the base surface 40 in the direction of the z axis by the distance 61 and the element surface 421 of the other base element 41 is spaced apart from the base surface 40 in the direction of the z axis by a distance 62.

If the microstructure 4 consists of a mixture of base elements 41 with different distances 61 and 62, a corresponding color impression results which is formed of a mixture of the individual color impressions.

This effect can be advantageously combined for example with the use of asymmetrical base elements, such as were described previously with reference to FIG. 5*a* to FIG. 6*b*. Further, this can also be further advantageously combined with the use of periodically arranged base elements or base elements following a function, such as were described previously with reference to FIG. 9*a* to FIG. 12.

Figure 13B:
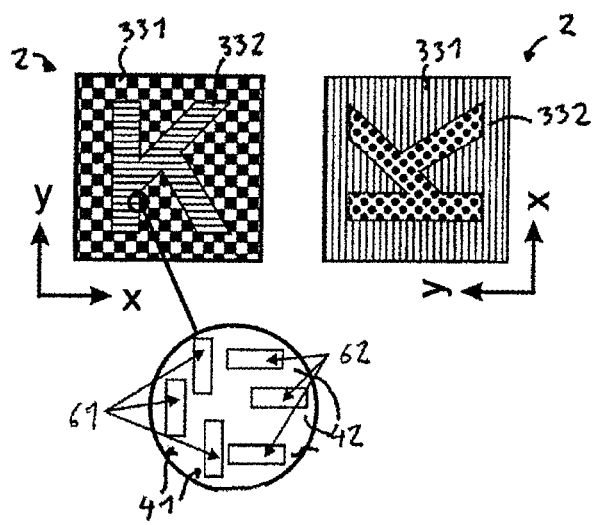
FIG. 13b shows several schematic top views of an area of a decorative element.

Thus, FIG. 13*b* shows for example a design in which asymmetrical base elements 41 with a distance 61 and asymmetrical base elements 42 with a distance 62 are provided in a first area 332. As indicated in the lower representation in FIG. 13*b*, the base elements 41 have not only a different distance of the base surfaces from the element surfaces, but also a different preferred direction, and thus enclose a 90-degree angle in the embodiment example according to FIG. 13*b* with respect to their preferred direction. Further, the area 332 is formed patterned as a foreground area formed in the shape of a K, which is surrounded by a background area 331. In this arrangement the following color effect can be achieved by rotating the decorative element 2 around an axis perpendicular to the base plane: If, for example, for a particular viewing angle $\alpha^*$ and in the case of a viewing parallel to the longitudinal axis of the base element (thus in the y direction) the base elements 41 with the distance 61 produce a clearly visible, reddish color impression in scattered light, in the case of a rotation by 90 degrees (maintaining the viewing angle $\alpha^*$) they produce an (only weakly visible) reddish or no color impression, and for this viewing angle $\alpha^*$ and in the case of a viewing parallel to the longitudinal axis of the base elements (thus in the x direction) the base elements 42 with the distance of the element surfaces from the base surface 62 produce a clearly visible, greenish color impression in the case of scattered light, and in the case of a rotation by 90 degrees (while maintaining the viewing angle $\alpha^*$ they produce an only weakly visible greenish or no color impression, then the security element has a color rotation effect of a reddish K against a green background. Together, this results in a very clearly recognizable color effect with a highly secure security feature.

Figure 13C:
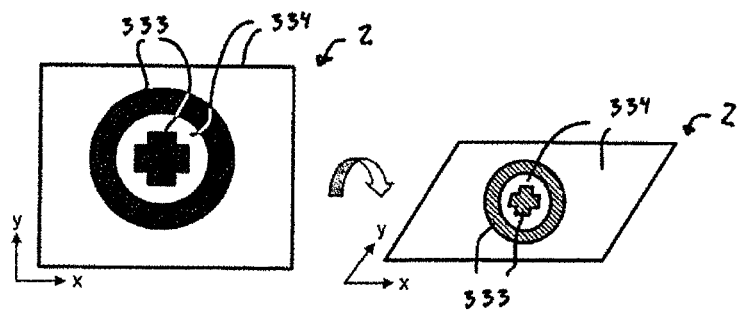
FIG. 13c shows a schematic top view of an area of a decorative element when viewed at different viewing/illumination angles.

Further, it is also possible for a microstructure which uses base elements 41 with different distances 61 and 62 to be provided in the areas 31 and 32 or in a partial area of the areas 31 and 32, wherein the base elements are not mixed, but are present in at least two macroscopic areas. The lateral size of these areas is typically larger than 300 µm and smaller than 50 mm. The macroscopic areas here can be formed in the form of logos, characters or the like. FIG. 13*c* now illustrates an embodiment example of this embodiment, wherein here first zones 333 are provided in which base elements 41 with a distance 61 of the element surfaces from the base surface are provided and several second zones 334 in which base elements 41 with a distance 62 of the element surfaces from the base surface are provided. For example, the effect illustrated in FIG. 13*c* appears, in which a contrast change effect results when the decorative element 2 is tilted around the x axis and for example the circle appears strongly greenish in one tilt and the background appears violet and when tilted by approx. 20 degrees the color impressions of these areas swap with each other.

If the base elements of one zone are formed as symmetrical base elements and those of the other zone are formed as asymmetrical base elements, one zone is color-constant in the case of a rotation, while the other zone varies in terms of the brightness of the color, and thus for example the zones 334 arranged in the background vary in terms of the brightness of their color.

Further, it is also possible for the surface coverage of the base plane with the base elements to be varied in the zones 333 and 334, in order thus to vary the color brightness of the respective zone to generate a grayscale image. In the case of a surface coverage of a respective partial area of the zones 333 and 334 with the base elements close to 50% the greatest brightness of the color results and in the case of a reduction or increase in the surface coverage of the respective partial area the brightness of the color reduces. The color value of the color is determined by the distance of the element surfaces of the base elements of the base surface, i.e. is determined by the distances 61 and 62 of the base elements 41. It is thus possible for example for an additional item of information to be encoded in this way in the zones 334 or 333, thus for example the zone 334 also has a portrait of a person visible in grayscale representation as an additional item of information.

The brightness of this grayscale image can furthermore also be varied by superimposition with further grating structures. It is particularly advantageous here to provide moth eye structures. These structures are preferably provided by cross gratings or hexagonal gratings with a period in the range of from 200 nm to 400 nm and a grating depth/period ratio of between 0.5 and 2. Through the use of such moth eye structures, partial areas of the zones 333 and 334 can be designed darker and a grayscale image can be generated in this way. It is thus also possible for example to produce the grayscale image only by targeted, partial superimposition of the zones 333 and 334 with such moth eye structures and thus for example to keep the surface coverage with the base elements within the zones 333 and 334 constant and to set the brightness level only by overlapping the zones 333 and 334 in partial areas partially with moth eye structures.

Figure 14A:
FIG. 14a shows a schematic top view of an image area of a decorative element.
Figure 14B:
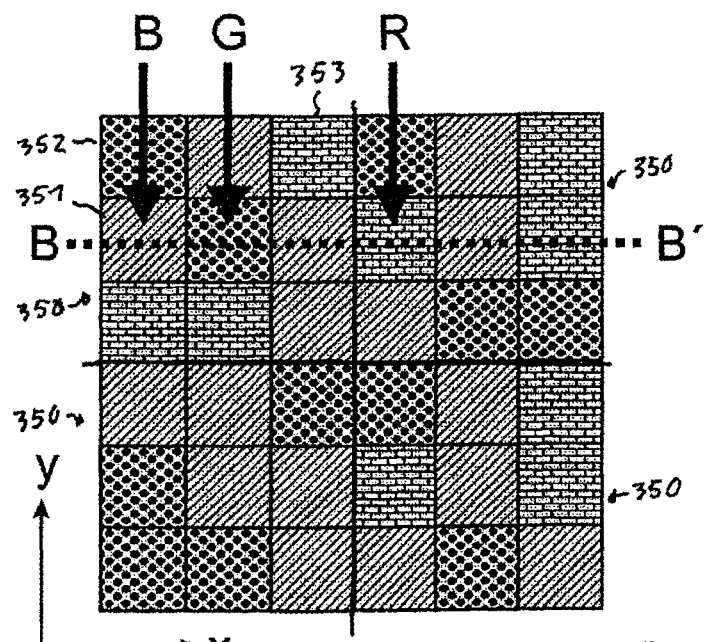
FIG. 14b shows a schematic top view of a section of the image area according to FIG. 14a with several image point areas.
Figure 14C:
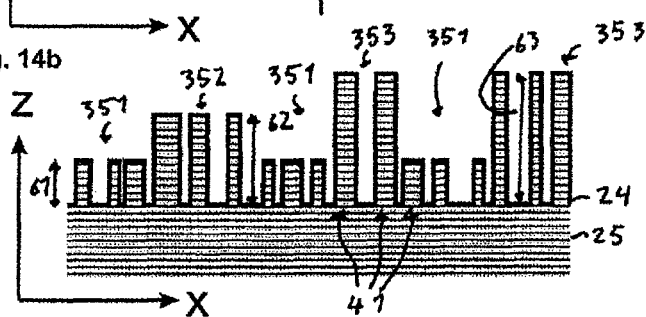
FIG. 14c shows a schematic sectional representation of a section of the decorative element according to FIG. 14b.
Figure 15:
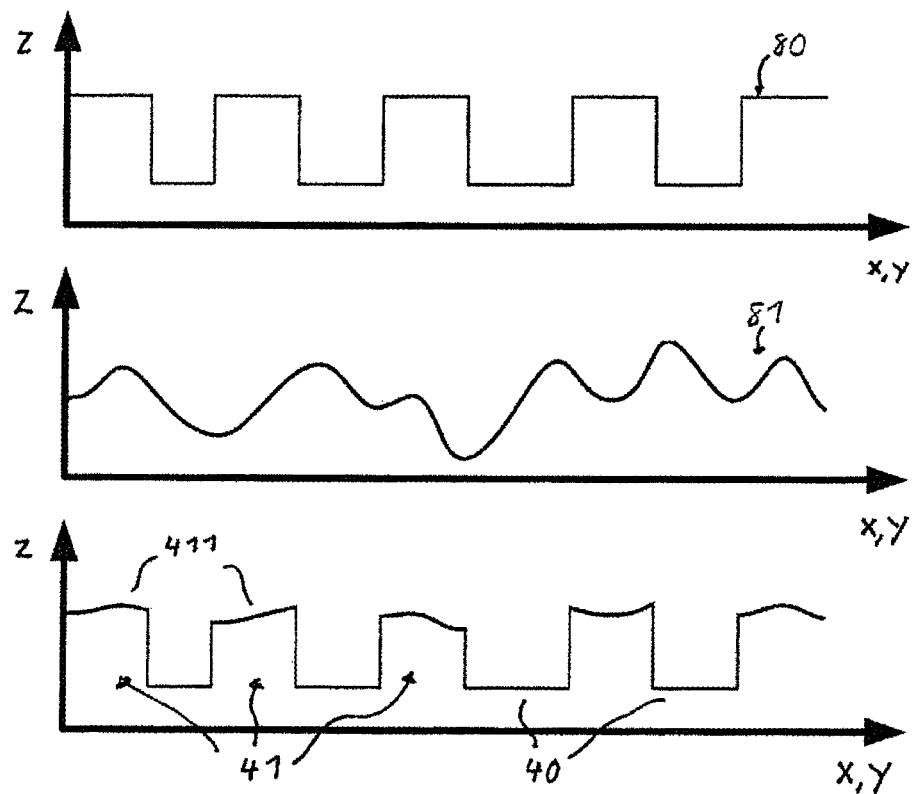
FIG. 15 shows several diagrams to illustrate the modulation of element surfaces of a microstructure with several base elements.

Further, it is also possible, through the use of first, second and third zones with different distances 61, 62 and 63 of the element surfaces from the base surfaces, to produce multicolor images or true-color images. FIG. 14a thus shows for example a true-color image 70. The image area of the true-color image 70 is now divided into a plurality of image point areas and the color value as well as the color brightness in the respective image point area is determined. An image area of the decorative element 2 is then divided into a plurality of image point areas and, in each of the image point areas, first, second and/or third zones are arranged such that the color and color brightness values fixed for the respective image point area are generated by the microstructure 4. FIG. 14b thus shows for example a section from such an image area with four image point areas 350. Several zones 351, 352 and 353 are provided in each case in the image point areas 350. The base elements arranged in the zones 351, 352 and 353 have a different distance of the element surfaces from the base surface, namely the distance 61, 62 and 63, as is also shown in the sectional representation according to FIG. 14c. The section is identified by B-B' in FIG. 14b. The molding and arrangement of the base elements 41 in the respective zone 351, 352 and 353 here is preferably chosen according to the previous embodiments according to FIG. 2a to FIG. 12.

Further, it is also possible in the embodiments of the microstructure 4 described previously with reference to FIG. 2a to FIG. 14 additionally to provide a concealed item of information in the areas 31 and 32. For this, it is possible for example, as illustrated with reference to FIG. 15, first to form a microstructure 80 according to the above statements and then in a second step to modulate the element surfaces and/or the base surface of the microstructure slightly through the illumination of a hologram 81 or writing of a computer-generated hologram. The height of the element surfaces or base surface hereby changes slightly locally. This disrupts the interference and thus changes the color of the microstructure 4, as shown in the lower representation of FIG. 15, which is why the modulation must also turn out to be slight. However, at the same time, the image information of the hologram is placed behind the microstructure 80, which image information is, however, accompanied by strong noise because of the low (slight) modulation. The strength of the modulation can lie in the range of +/−50% of the height, but preferably lies in the range of +/−20% and further preferably in the range of +/−10%. If only the element surface or the base surface is modulated, the color effects of the microstructure are more striking and thus visible. The image information of the hologram, however, is very noisy for this, as mentioned above. If both planes are modulated, the disruption of the color effects is stronger. The image information of the hologram is not very noisy for this. In the case of a viewing in ambient light, the concealed item of information is not or is just barely visible (because of the very low modulation). In the case of illumination with suitable laser light, the hologram appears. The laser wavelength ($\lambda$) that is optimum for the reconstruction of the hologram is twice the distance 61 ($h$) times the refractive index (n) of the surrounding medium ($\lambda=2*h*n$).

Figure 16:
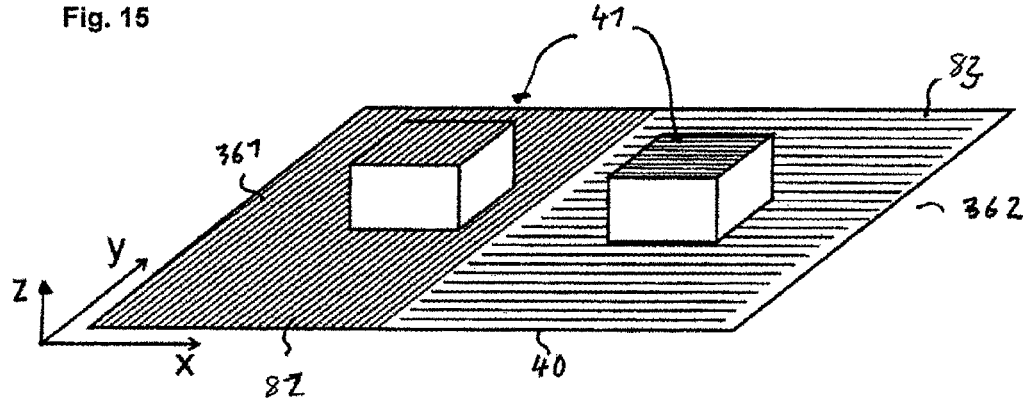
FIG. 16 shows a schematic three-dimensional representation of a section of a microstructure.

A further design, shown in FIG. 16, provides a modulation of the element surface of the base elements 41 and/or the base surface 40 with a specific grating structure. Thus, for example, the base surface and the element surface of the base elements 41 with a diffractive structure 82 are modulated in an area 361 and the base surface 40 and the element surfaces of the base elements 41 with a diffractive structure 83 are modulated in an area 362. The diffractive structures 82 and 83 here differ in the alignment of their grating lines, as indicated in FIG. 16. The grating structures can be linear, crossed or hexagonal. The grating period of the gratings 82 and 83 is preferably chosen to be between 100 nm and 2000 nm, further preferably between 200 nm and 500 nm. The gratings 82 and 83 can be part of a design. In particular, the gratings 82 and 83 can be zero-order polarization gratings. Areas can thereby be provided with a logo or background which is TE-polarized and other areas, e.g. the background of the logo or image, can be provided with the orthogonal polarization TM. TE here denotes a transverse electric wave (TE=transverse electric) and TM denotes a transverse magnetic wave (TM=transverse magnetic). With reference to line gratings, by TE-polarized light is meant the light in which the electric field component is parallel to the grating lines and by TM-polarized light is meant the light in which the electric field component is perpendicular to the grating lines. The logo or image appears in the case of a viewing with a polarization filter. Correspondingly, the areas 361 and 362 can thus be formed as background and pattern area, which only become visible in the case of a viewing through a polarizer. As in the case of the up-modulated hologram from FIG. 15, the modulation of the grating structure must be low, in particular must lie in the range of +/−50% of the height, but must preferably lie in the range of +/−20% and further preferably in the range of +/−10%. The modulation depth of the hologram or the diffraction grating is preferably smaller than 100 nm, particularly preferably smaller than 50 nm and further preferably smaller than 30 nm. The modulation thereby only slightly disrupts the interference which produces the color effect.

A further preferred embodiment combines the hitherto described microstructures that generate color effects with refractive, achromatic micromirrors as are described for example in DE 10 2008 046 128 A1.

Here, the base plane is defined by the micromirrors, i.e. the base plane changes from micromirror to micromirror. The depth of the microstructures on the micromirror, i.e. the distance 61, is preferably the same, in order that the achromatic effect of the micromirrors is superimposed with the color effect of the microstructures.

Figure 17:
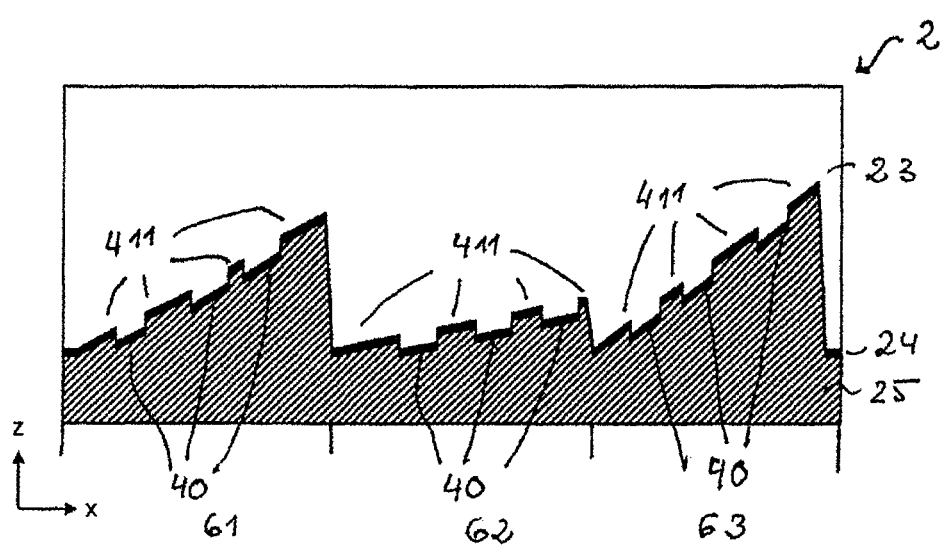
FIG. 17 shows a schematic sectional representation of a decorative element.

FIG. 17 shows this embodiment in a schematic side view. In different partial areas 61, 62 and 63, in each case a different base plane is provided here which is defined by the micromirrors, in particular is defined by the micromirrors formed in DE 10 2008 046 128 A1. In each of the partial areas 61, 62 and 63, the element surfaces 411 of the base elements as well as the base surfaces 40 are aligned parallel to the respective base plane. Further, the base planes in the areas 61, 62 and 63 are not arranged parallel to each other, but are tilted relative to each other, as shown in FIG. 17.

The invention claimed is:

1. A decorative element, wherein the decorative element has a microstructure which generates an optical effect in incident light or with light passing through, wherein the microstructure has, in a first area a base surface and several base elements which in each case have an element surface that is raised or lowered compared with the base surface and a flank arranged between the element surface and the base surface, wherein the base surface of the microstructure defines a base plane spanned by coordinate axes x and y, wherein the element surfaces of the base elements in each case run substantially parallel to the base plane and wherein in at least one or more first zones of the first area the element surfaces of the base elements and the base surface are spaced apart in a direction running perpendicular to the base plane in the direction of a coordinate axis z by a first distance which is chosen such that a first color is generated in the one or more first zones by interference of the light reflected at the base surface and the element surfaces, in incident light, or by interference of the light transmitted through the element surfaces and the base surfaces, with light passing through, wherein the microstructure is designed such that it generates the first color in the first diffraction order or in scattered light, and
wherein the base elements are molded and arranged in the first area such that between 20% of the incident light and 90% of the incident light is deflected out of the zero order by scattering or diffraction.

2. A decorative element according to claim 1, wherein the base elements are molded and arranged in the first area such that the incident light is deflected by the base elements by scattering or by diffraction out of direct reflection or direct transmission or of the zero diffraction order such that in a viewing in direct reflection or direct transmission or in the zero diffraction order a second color different from the first color is generated.

3. A decorative element according to claim 1, wherein in at least one or more second or third zones of the first area, the element surfaces of the base elements and the base surface are spaced apart in a direction running perpendicular to the base plane in the direction of the coordinate axis z by a second or third distance respectively which differs from the first distance and is chosen such that a third or fourth color which differs from the first or second color is generated in the one or more second or third zones by interference of the light reflected at the base surface and the element surfaces in incident light or by interference of the light transmitted through the element surfaces and the base surface with light passing through.

4. A decorative element according to claim 1, wherein the base elements are molded and arranged in the first area such that the incident light is scattered in at least one direction in a scattering angle range up to 30 degrees around the zero diffraction order.

5. A decorative element according to claim 1, wherein at least one lateral extension of the projection of each base element onto the base plane is between 0.25 µm and 50 µm.

6. A decorative element according to claim 1, wherein the minimum distance of neighboring base elements is chosen to be between 0.5 µm and 300 µm.

7. A decorative element according to claim 1, wherein the molding or positioning of the base elements in the first area or in at least one first partial area of the first area is varied pseudorandomly.

8. A decorative element according to claim 7, wherein in the first area or in the at least one first partial area of the first area, one or more of the parameters:
positioning of the base element, spacing of the base element from the closest neighboring base element, size of the shape or surface area of the projection of the base element onto the base plane and lateral preferred direction of the projection of the base element onto the base plane of the base elements arranged in the first area or in the at least one first partial area, is varied pseudorandomly within a variation range in each case predefined for the first area or the respective first partial area.

9. A decorative element according to claim 8, wherein the parameters which are varied pseudorandomly in a first of the first partial areas and in a second of the first partial areas differ or at least one variation range of the varied parameters is chosen to be different in a first of the first partial areas and in a second of the first partial areas, the at least one variation range in the first of the first partial areas differs from that in the second of the first partial areas by at least 10%.

10. A decorative element according to claim 8, wherein the predefined variation range comprises between 5 and 20 values.

11. A decorative element according to claim 7, wherein a two-dimensional grid spanned by the coordinate axes x and y defines, for each of the base elements arranged in the first area or in the first partial area, a normal position of the respective base element in the base plane and in that the position of each of the base elements in the first area or in the first partial area is determined by a pseudorandom shift out of the respective normal position in the direction of the coordinate axis x or in the direction of the coordinate axis y.

12. A decorative element according to claim 7, wherein at least one lateral dimension of the projection of the respective base element onto the base plane is varied pseudorandomly in a variation range of from 1 µm to 10 µM.

13. A decorative element according to claim 7, wherein one or more of the base elements are symmetrical base elements in which the projection of the base element onto the base plane has a symmetrical shape or wherein one or more of the base elements are asymmetrical base elements in which the projection of the base element onto the base plane has an asymmetrical shape with a lateral dimension in a preferred direction running parallel to the base plane which is larger than the lateral dimension of the projection transverse to the preferred direction is 50% larger than the lateral dimension of the projection transverse to the preferred direction.

14. A decorative element according to claim 13, wherein in the first area or in a partial area of the first area, the base elements are asymmetrical base elements which have the same preferred direction.

15. A decorative element according to claim 13, wherein, in the first area or in a partial area of the first area, the base elements are asymmetrical base elements the preferred direction of which in each case is varied pseudorandomly in a predefined variation range, wherein an angle range of from +180 degrees to −180 is chosen as variation range.

16. A decorative element according to claim 13, wherein the first area or first partial area of the first area has one or more first cells or one or more second cells wherein the base elements arranged in the first and second cells are asymmetrical base elements, wherein the asymmetrical base elements of the first cells have a first preferred direction and the asymmetrical base elements of the second cells have a second preferred direction which differs from the first preferred direction.

17. A decorative element according to claim 16, wherein the first area or the first partial area of the first area has one or more third cells and wherein the base elements arranged in the third cells are symmetrical base elements.

18. A decorative element according to claim 16, wherein the one or more first, second or third cells have at least one lateral dimension parallel to the base plane of less than 100 μm.

19. A decorative element according to claim 16, wherein the base elements are molded and arranged in the first area such that the incident light is deflected by the base elements by scattering or by diffraction out of direct reflection or direct transmission or of the zero diffraction order such that in a viewing in direct reflection or direct transmission or in the zero diffraction order a second color different from the first color is generated and wherein the one or more first cells in each case are arranged overlapping with a first zone, the one or more second cells in each case are arranged overlapping with a second zone or the one or more third cells are arranged overlapping with a third zone, with the result that the element surfaces of the base elements and the base surface are spaced apart in a direction running perpendicular to the base plane in the direction of the coordinate axis z by the first distance in the one or more first cells, by the second distance in the one or more second cells or by the third distance in the one or more third cells.

20. A decorative element according to claim 1, wherein the projection of one or more of the base elements onto the base plane has the shape of a symbol or a letter or a microtext, in order to provide an item of optical information hidden from the human eye without the use of an aid.

21. A decorative element according to claim 1, wherein in the first area or in one and more second partial areas of the first area, the base elements follow on from each other periodically at least in areas, and follow on from each other with a period of between 0.75 μm and 10 μm.

22. A decorative element according to claim 21, wherein one or more cells are provided with in each case several second partial areas in which the base elements in each case follow on from each other periodically, in that the sequence of the base elements in each of these second partial areas is defined by the parameters azimuth angle, base element shape and/or spatial frequency, and wherein one or more of the parameters azimuth angle, base element shape and/or spatial frequency of the second partial areas arranged in the cell are varied pseudorandomly from second partial area to second partial area within a variation range predefined for the cell.

23. A decorative element according to claim 22, wherein the parameter azimuth angle is varied in a variation range of from −180 degrees to +180 degrees, −90 degrees to +90 degrees or −30 degrees to +30 degrees and/or is varied in steps of 15 degrees.

24. A decorative element according to claim 22, wherein the second partial areas in each case have at least one lateral dimension parallel to the base plane of between 10 μm and 50 μm or wherein the one or more cells in each case have at least one lateral dimension parallel to the base plane of between 80 μm and 200 μm.

25. A decorative element according to claim 1, wherein in the first area or in one or more third partial areas of the first area, the base elements are positioned following a non-periodic function.

26. A decorative element according to claim 25, wherein the width of the base elements or the spacing of the base elements varies in one or more directions, and increases or decreases linearly locally in one or more directions.

27. A decorative element according to claim 25, wherein the arrangement of the base elements and the surface dimensions of the projections of the respective base elements onto the base plane in the first area or in the third partial area are determined by a function which describes a binary diffraction structure which deflects the incident light to generate a first item of information by diffraction, by diffraction in the first diffraction order, and the first distance, the second distance and/or the third distance or a multiple of the first, second or third distance is chosen as the spacing of the element surfaces of the base elements from the base surface in the direction of the z coordinate axis in the first area or in the third partial area and thus an item of color information determined hereby is generated as second item of information in the first area or the third partial area.

28. A decorative element according to claim 27, wherein the binary diffraction structure deflects the light according to a predefined three-dimensional free-form surface with one or more free-form elements, wherein the free-form elements are selected from: free-form elements in the form of a section of a surface of a three-dimensional object, free-form elements producing lens-like magnification, demagnification or distortion effects in the form of an alphanumerical character, a geometric figure or another object.

29. A decorative element according to claim 25, wherein the arrangement of the base elements and the surface dimension of the projections of the respective base elements in the first area or in the third partial area are chosen according to a function which results from the binarization of the function of a hologram, a computer-generated hologram or a kinoform, and in which the first distance, the second distance and/or the third distance or a multiple of the first, second or third distance is chosen as the spacing of the element surfaces of the base elements from the base surface in the direction of the z coordinate axis.

30. A decorative element according to claim 1, wherein one or more of the base elements have one or more further element surfaces which in each case run substantially parallel to the base surface and the one or more further element surfaces are spaced apart from the base surface in the direction of the coordinate axis z by a multiple of the first distance when the base element is arranged in one of the first zones, by a multiple of the second distance when the base element is arranged in one of the second zones and by a multiple of the third distance when the base element is arranged in one of the third zones.

31. A decorative element according to claim 1, wherein in the first area or in a fourth partial area of the first area, the element surfaces are modulated to provide a concealed item of information which is readable by means of a laser or by means of a polarizer.

32. A decorative element according to claim 1, wherein the decorative element has one or more second areas in which the microstructure is formed in the form of a diffraction grating, a hologram, a Kinegram®, a microlens structure, a blazed grating or a macrostructure.

33. A decorative element according to claim 1, wherein, in different partial areas of the first area, the base surface and the element surfaces of the microstructure run parallel to a respective base plane and the base planes of these partial areas are tilted relative to each other.

34. A security document with a decorative element according to claim 1.

35. A decorative element, wherein the decorative element has a microstructure which generates an optical effect in incident light or with light passing through, wherein the microstructure has, in a first area a base surface and several base elements which in each case have an element surface that is raised or lowered compared with the base surface and a flank arranged between the element surface and the base surface, wherein the base surface of the microstructure defines a base plane spanned by coordinate axes x and y, wherein the element surfaces of the base elements in each case run substantially parallel to the base plane and wherein in at least one or more first zones of the first area the element surfaces of the base elements and the base surface are spaced apart in a direction running perpendicular to the base plane in the direction of a coordinate axis z by a first distance which is chosen such that a first color is generated in the one or more first zones by interference of the light reflected at the base surface and the element surfaces, in incident light, or by interference of the light transmitted through the element surfaces and the base surfaces, with light passing through, wherein the microstructure is designed such that it generates the first color in the first diffraction order or in scattered light, and
    wherein the average surface coverage of the base plane with the base elements in the first area or in the first, second or third partial areas is between 30% and 70%.

36. A decorative element according to claim 35, wherein the flank angle of the flanks of the base elements is larger than 70 degrees.

37. A decorative element according to claim 35, wherein the first distance is between 150 nm and 1000 nm.

38. A decorative element, wherein the decorative element has a microstructure which generates an optical effect in incident light or with light passing through, wherein the microstructure has, in a first area a base surface and several base elements which in each case have an element surface that is raised or lowered compared with the base surface and a flank arranged between the element surface and the base surface, wherein the base surface of the microstructure defines a base plane spanned by coordinate axes x and y, wherein the element surfaces of the base elements in each case run substantially parallel to the base plane and wherein in at least one or more first zones of the first area the element surfaces of the base elements and the base surface are spaced apart in a direction running perpendicular to the base plane in the direction of a coordinate axis z by a first distance which is chosen such that a first color is generated in the one or more first zones by interference of the light reflected at the base surface and the element surfaces, in incident light, or by interference of the light transmitted through the element surfaces and the base surfaces, with light passing through, wherein the microstructure is designed such that it generates the first color in the first diffraction order or in scattered light, and
    wherein one or more of the first zones have lateral dimensions parallel to the base plane in the macroscopic range, in the range of between 300 μm and 50 mm, and an optically recognizable item of information is provided by the molding of these first, second and/or third zones as pattern area and/or background area.

39. A decorative element according to claim 38, the surface coverage of the respective zones with the base elements is varied locally in one or more of the first zones, for the local variation of the color brightness of the respective zone.

40. A decorative element, wherein the decorative element has a microstructure which generates an optical effect in incident light or with light passing through, wherein the microstructure has, in a first area a base surface and several base elements which in each case have an element surface that is raised or lowered compared with the base surface and a flank arranged between the element surface and the base surface, wherein the base surface of the microstructure defines a base plane spanned by coordinate axes x and y, wherein the element surfaces of the base elements in each case run substantially parallel to the base plane and wherein in at least one or more first zones of the first area the element surfaces of the base elements and the base surface are spaced apart in a direction running perpendicular to the base plane in the direction of a coordinate axis z by a first distance which is chosen such that a first color is generated in the one or more first zones by interference of the light reflected at the base surface and the element surfaces, in incident light, or by interference of the light transmitted through the element surfaces and the base surfaces, with light passing through, wherein the microstructure is designed such that it generates the first color in the first diffraction order or in scattered light, and
    wherein one or more of the first zones have at least one lateral dimension parallel to the base plane of less than 300 μm.

41. A decorative element according to claim 40, wherein the surface coverage of the respective zone with the base elements is chosen to be different in first, second or third zones, in order to achieve a different color brightness of the respective zones.

42. A decorative element according to claim 40, wherein, in one or more fourth zones, the microstructure is formed by a moth eye structure and wherein one or more fourth zones as well as one or more first, second or third zones are arranged next to each other for the local variation of the color brightness.

43. A decorative element according to claim 40, wherein the security element has an image area which is divided into a plurality of image point areas, wherein each image point area has at least one lateral dimension parallel to the base plane of less than 300 μm, wherein one or more of the image point areas are in each case covered with one or more first, second, third or fourth zones, wherein the color value of at least one image point area is determined by additive color mixing of the colors generated by two different zones of the image point area, selected from first zone, second zone and third zone.

44. A decorative element according to claim 43, wherein the color value of one or more image point areas is determined by the surface proportion of the first, second and third zones in the image point area and the color brightness of the image point area is determined by the surface proportion of the fourth zone in the image point area or the surface coverage of the image point area with the base elements.

45. A decorative element according to claim 40, wherein the microstructure is molded at least in areas between a first layer and a second layer of the decorative element, wherein the first layer is a transparent layer with a refractive index $n_1$ and the second layer is a reflective layer, in particular is a metal layer, an HRI layer or a reflective multi-layer system.

46. A decorative element according to claim 40, wherein the microstructure is molded at least in areas between a first layer of the decorative element and a third layer of the decorative element, wherein the first layer is a transparent layer with a refractive index $n_1$ and the third layer is a transparent layer with a refractive index $n_2$, and wherein the refractive index $n_1$ and the refractive index $n_2$ differ by at least 0.2.

47. A decorative element, wherein the decorative element has a microstructure which generates an optical effect in incident light or with light passing through, wherein the microstructure has, in a first area a base surface and several base elements which in each case have an element surface that is raised or lowered compared with the base surface and a flank arranged between the element surface and the base surface, wherein the base surface of the microstructure defines a base plane spanned by coordinate axes x and y, wherein the element surfaces of the base elements in each case run substantially parallel to the base plane and wherein in at least one or more first zones of the first area the element surfaces of the base elements and the base surface are spaced apart in a direction running perpendicular to the base plane in the direction of a coordinate axis z by a first distance which is chosen such that a first color is generated in the one or more first zones by interference of the light reflected at the base surface and the element surfaces, in incident light, or by interference of the light transmitted through the element surfaces and the base surfaces, with light passing through, wherein the microstructure is designed such that it generates the first color in the first diffraction order or in scattered light, and wherein the element surface and the base surface are tilted relative to each other by between 5 degrees and 30 degrees.

* * * * *